US010395433B2

(12) United States Patent
Tomatsu

(10) Patent No.: US 10,395,433 B2
(45) Date of Patent: *Aug. 27, 2019

(54) TRAFFIC SITUATION AWARENESS FOR AN AUTONOMOUS VEHICLE

(71) Applicant: TOYOTA JIDOSHA KABUSHIKI KAISHA, Toyota-shi, Aichi-ken (JP)

(72) Inventor: Nobuyuki Tomatsu, Toyota (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/110,080

(22) Filed: Aug. 23, 2018

(65) Prior Publication Data

US 2018/0365902 A1    Dec. 20, 2018

Related U.S. Application Data

(63) Continuation of application No. 15/603,101, filed on May 23, 2017, now Pat. No. 10,083,547.

(51) Int. Cl.
*G06T 19/00* (2011.01)
*B60K 35/00* (2006.01)
(Continued)

(52) U.S. Cl.
CPC .......... *G06T 19/006* (2013.01); *B60K 35/00* (2013.01); *G02B 27/0101* (2013.01); *G02B 27/0172* (2013.01); *G08G 1/0112* (2013.01); *G08G 1/0137* (2013.01); *G08G 1/09675* (2013.01); *G08G 1/096725* (2013.01); *G08G 1/096775* (2013.01); *B60K 2350/2017* (2013.01); *B60K 2350/2056* (2013.01); *B60K 2350/357* (2013.01); *B60K 2350/921* (2013.01); *G02B 2027/014* (2013.01); *G02B 2027/0178* (2013.01)

(58) Field of Classification Search
CPC ....... G06T 19/006; G06T 19/00; G06F 3/011; G06F 3/012; G02B 27/017
See application file for complete search history.

(56) References Cited

U.S. PATENT DOCUMENTS 8,098,171 B1 *  1/2012  Szczerba ............... B60Q 9/008
                                             340/438
8,547,298 B2 * 10/2013  Szczerba ............... G01S 13/723
                                             340/436
(Continued)

*Primary Examiner* — Abderrahim Merouan
(74) *Attorney, Agent, or Firm* — Burbage Law, P.C.; Jon-Michael Burbage; Elizabeth Ruzich

(57) ABSTRACT

The disclosure includes embodiments for providing traffic situation awareness for a driver of an autonomous vehicle. In some embodiments, the autonomous vehicle is a highly autonomous vehicle (HAV). A method implemented by the HAV includes, according to some embodiments, analyzing external sensor data recorded by one or more external sensors of the HAV to identify a traffic situation. The external sensor data describes one or more measurements of a physical environment external to the HAV. The method includes generating graphical data describing visual feedback that visually depicts information describing the traffic situation. The method includes providing the graphical data to an interface device to cause the interface device to display the visual feedback. The interface device is communicatively coupled to the HAV and operable to receive the graphical data from the processor of the HAV. The visual feedback provides the traffic situation awareness to the driver of the HAV.

20 Claims, 13 Drawing Sheets

(51) Int. Cl.
G02B 27/01 (2006.01)
G08G 1/0967 (2006.01)
G08G 1/01 (2006.01)

(56) References Cited

U.S. PATENT DOCUMENTS

| | | | | |
|---|---|---|---|---|
| 8,757,807 | B1* | 6/2014 | Disley | G03B 29/00 |
| | | | | 353/13 |
| 8,903,592 | B1* | 12/2014 | Mariet | B60T 7/22 |
| | | | | 701/28 |
| 9,272,708 | B2* | 3/2016 | Cuddihy | B60R 11/0229 |
| 9,501,058 | B1* | 11/2016 | Mariet | B60T 7/22 |
| 2001/0027360 | A1* | 10/2001 | Nakano | G01C 21/26 |
| | | | | 701/23 |
| 2010/0253918 | A1* | 10/2010 | Seder | G01S 13/723 |
| | | | | 353/13 |
| 2010/0254019 | A1* | 10/2010 | Cui | G01S 13/723 |
| | | | | 359/633 |
| 2012/0173069 | A1 | 7/2012 | Tsimhoni et al. | |
| 2015/0097864 | A1* | 4/2015 | Alaniz | G06T 19/006 |
| | | | | 345/633 |
| 2015/0321606 | A1* | 11/2015 | Vartanian | G02B 27/0101 |
| | | | | 348/148 |

* cited by examiner

TRAFFIC SITUATION AWARENESS FOR AN AUTONOMOUS VEHICLE

CROSS-REFERENCE TO RELATED APPLICATIONS

This patent application is a continuation of U.S. patent application Ser. No. 15/603,101, entitled "Traffic Situation Awareness for an Autonomous Vehicle" filed on May 23, 2017, the entirety of which is hereby incorporated by reference.

BACKGROUND

The specification relates to providing traffic situation awareness for a driver of an autonomous vehicle. The driver of an autonomous vehicle is a human user in a driver seat of the autonomous vehicle.

Vehicle control systems are becoming increasingly popular. One example of a vehicle control system is an Advanced Driver Assistance System ("ADAS system" if singular, "ADAS systems" if plural).

ADAS systems provide one or more autonomous features to the vehicles which include these ADAS systems. For example, an ADAS system may monitor the position of a vehicle relative to the lane in which the vehicle is traveling, and if the vehicle begins to swerve outside of that lane the ADAS system may take remedial action by repositioning the vehicle so that the vehicle stays in the lane or providing a notification to a driver of the vehicle so that the driver knows that they need to take action to remedy the situation.

Some vehicles include a sufficient number and quality of autonomous features that they are considered to be autonomous vehicles.

Autonomous vehicles cannot handle all traffic situations without their drivers intervening to assist them. There are also some traffic situations that have qualities such that drivers do not trust their autonomous vehicles to handle these traffic situations. Both of these are categories of traffic situations which require that drivers provide their attention to the roadway and intervene in the operation of their autonomous vehicles using their knowledge of the current traffic situation.

SUMMARY

The National Highway Traffic Safety Administration ("NHTSA") has defined different "levels" of autonomous vehicles, e.g., Level 0, Level 1, Level 2, Level 3, Level 4 and Level 5. If a vehicle has a higher-level number than another vehicle (e.g., Level 3 is a higher-level number than Levels 2 or 1), then the vehicle with a higher-level number offers a greater combination and quantity of autonomous features relative to the vehicle with the lower level number. The different levels of autonomous vehicles are described briefly below.

Level 0: The set of ADAS systems installed in the vehicle have no vehicle control but may issue warnings to the driver of the vehicle.

Level 1: The driver must be ready to take control at any time. The set of ADAS systems installed in the vehicle may provide autonomous features such as one or more of the following: Adaptive Cruise Control ("ACC"); and Parking Assistance with automated steering and Lane Keeping Assistance ("LKA") Type II, in any combination.

Level 2: The driver is obliged to detect objects and events in the roadway environment and respond if the set of ADAS systems installed in the vehicle fail to respond properly (based on the driver's subjective judgement). The set of ADAS systems installed in the vehicle executes accelerating, braking, and steering. The set of ADAS systems installed in the vehicle can deactivate immediately upon takeover by the driver.

Level 3: Within known, limited environments (such as freeways), the driver can safely turn their attention away from driving tasks but must still be prepared to take control of the vehicle when needed.

Level 4: The set of ADAS systems installed in the vehicle can control the vehicle in all but a few environments such as severe weather. The driver must enable the automated system (which is comprised of the set of ADAS systems installed in the vehicle) only when it is safe to do so. When the automated system is enabled, driver attention is not required for the vehicle to operate safely and consistent with accepted norms.

Level 5: Other than setting the destination and starting the system, no human intervention is required. The automated system can drive to any location where it is legal to drive and make its own decision (which may vary based on the jurisdiction where the vehicle is located).

When an autonomous vehicle is operating at Level 2, the driver has to look forward and monitor the traffic situation most of time. Because the driver is looking forward and monitoring the traffic situation most of the time, our research indicates that the driver tends to feel safe since they are aware of the traffic situation and can intervene when the vehicle encounters a traffic situation that scares them. However, when the autonomous vehicle is operating at Level 3 or higher, the autonomous vehicle handles almost all of the driving tasks for the driver such that the driver is free to do "personal tasks" other than looking forward and monitoring the traffic situation (e.g., playing a video game, reading a book, eating a food, doing work on their laptop, etc.).

In many cases, when the driver is doing these personal tasks they assume a posture that makes it unlikely that they are looking forward or easily aware of the traffic situation. For example, the driver assumes the following postures: looking down at their phone, book, food or laptop; watching the view from a side window; looking at passengers or baggage in passenger seat; looking at passengers or baggage in the back seat, etc. In these situations, the driver is unable (or unlikely) to monitor the traffic situation without changing their posture. The driver may also not want to change their posture. For example, if a driver is working on their laptop they may not want to look up because they are focused on their work.

Even in a Level 3 autonomous driving system, the driver may be scared if they do not understand the current traffic situation because they worry or have anxiety that it is possible that the autonomous vehicle is managing a dangerous situation in the roadway at any given moment (e.g., a bad driver on the road, driving right next to a cliff, a large number of nearby pedestrians, an intersection with difficult lines of sight, etc.). As a result, the driver is never able to truly relax and enjoy the driving experience because of their worry and anxiety.

Described herein is a situation awareness system and method which solves this problem by: (1) identifying the presence of traffic situations that require the attention or intervention of the driver of an autonomous vehicle; (2) determining graphical data describing visual feedback (e.g., a visual notification, graphic or overlay) that describes, for example, the traffic situations; and (3) controlling the operation of an interface device to provide the visual feedback to the driver.

The interface device includes one or more electronic devices which are operable to display visual feedback generated by the situation awareness system. The visual feedback generated by the situation awareness system and displayed by the interface device include visual content that describe one or more of the following types of information which are determined by the situation awareness system: (1) the traffic situation (e.g., the current traffic situation or estimates of the future traffic situation); (2) an estimated danger level which is associated with the traffic situation; and (3) a recommended action by the driver in response to the traffic situation.

In some embodiments, the interface device may include one or more electronic computing devices which are brought into the autonomous vehicle by a driver of the autonomous vehicle and not installed as an element of the autonomous vehicle. For example, the interface device may include one or more of the following: a smartphone; a laptop; a smartwatch; an electronic book device (i.e., an "e-reader," "e-book reader" or "e-book device"); tablet computing device or some other personal electronic device which includes an electronic display and wireless communication capability which enables it to send and receive wireless messages from a communication unit of the vehicle via one of the wireless communication protocols described below with reference to FIG. 1A.

In some embodiments, the interface device may include an augmented reality (herein "AR") display device. An AR display device includes an electronic device having a transparent electronic display which is operable to display graphical content (e.g., graphical overlays, three-dimensional graphical overlays, three-dimensional graphics, etc.) while still allowing the driver to see the real-world. For example, the AR display device includes one or more of a pair of AR goggles or a three-dimensional heads-up display (herein a "3D-HUD) installed in the windshield of the autonomous vehicle (see, e.g., FIG. 6).

As described above, the situation awareness system is an element of an autonomous vehicle. In some embodiments, the autonomous vehicle is a Highly Autonomous Vehicle ("HAV" if singular, or "HAVs" if plural). An HAV is a vehicle that includes a set of ADAS systems that operate at Level 3 or higher as defined by the NHTSA on page 9 of their policy paper entitled "Federal Automated Vehicles Policy: Accelerating the Next Revolution in Roadway Safety," which was published in September of 2016. The set of ADAS systems is referred to herein as an "ADAS system set." See, e.g., the ADAS system set 180 depicted in FIG. 1A.

In some embodiments, the situation awareness system is a system installed in an HAV that is designed to provide the driver of the HAV with traffic situation awareness when the driver is not looking forward. As used herein, "looking forward" means looking through the windshield of their vehicle in a manner that is similar to how a driver sits to operate a typical vehicle which is not an HAV. The situation awareness system monitors the current traffic situation in the real-world and provides visual feedback to the driver of the HAV via the interface device. For example, the situation awareness system controls the operation of the interface device to provide visual feedback to the driver which is configured to make the driver aware of the current traffic situation or estimates of the future traffic situation.

In some embodiments, the situation awareness system monitors for unusual traffic situations which require the driver's attention and controls the operation of the interface device to make the driver aware of the unusual traffic situation when the driver would otherwise be distracted, thereby increasing the safety of the vehicle.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method implemented by a HAV, the method including: analyzing external sensor data recorded by one or more external sensors of the HAV to identify a traffic situation, where the external sensor data describes one or more measurements of a physical environment external to the HAV; generating graphical data describing visual feedback that visually depicts information describing the traffic situation; and providing, by a processor of the HAV, the graphical data to an interface device to cause the interface device to display the visual feedback, where the interface device is communicatively coupled to the HAV and operable to receive the graphical data from the processor of the HAV. Other embodiments of this aspect include corresponding computer systems, apparatus, and computer programs recorded on one or more computer storage devices, each configured to perform the actions of the methods.

Implementations may include one or more of the following features. The method where the interface device is an AR display device and the graphical data is operable to cause the AR display device to provide an augmented reality experience. The method where the AR display device is selected from a group that includes: a set of AR goggles; and a set of AR glasses. The method where the AR display device is a 3D-HUD which is an element of the HAV. The method where the interface device is selected from a group that includes: a smartphone; a laptop; a tablet computer; an e-book reader; and a smartwatch. The method further including generating position data describing a position where the visual feedback is displayed in an electronic display of the interface device and providing the position data and the graphical data to the interface device so that the visual feedback described by the graphical data is displayed at the position described by the position data. The method where the position data is operable so that the position where the visual feedback is displayed in the electronic display of the interface device does not obstruct an object which is being viewed by a driver of the HAV. Implementations of the described techniques may include hardware, a method or process, or computer software on a computer-accessible medium.

One general aspect includes a system of a HAV, the system including: an onboard vehicle computer system including a non-transitory memory storing computer code which, when executed by the onboard vehicle computer system causes the onboard vehicle computer system to: analyze external sensor data recorded by one or more external sensors of the HAV to identify a traffic situation, where the external sensor data describes one or more measurements of a physical environment external to the HAV; generate graphical data describing visual feedback that visually depicts information describing the traffic situation; and provide, by a processor of the HAV, the graphical data to an interface device to cause the interface device to display the visual feedback, where the interface device is communicatively coupled to the HAV and operable to receive the graphical data from the processor of the HAV. Other embodiments of this aspect include corresponding computer systems, apparatus, and computer programs recorded on one or more computer storage devices, each configured to perform the actions of the methods.

Implementations may include one or more of the following features. The system where the interface device is an AR display device and the graphical data is operable to cause the AR display device to provide an AR experience. The system where the AR display device is selected from a group that includes: a set of AR goggles; and a set of augmented reality glasses. The system where the AR display device is a 3D-HUD which is an element of the HAV. The system where the interface device is selected from a group that includes: a smartphone; a laptop; a tablet computer; an e-book reader; and a smartwatch. The system where the non-transitory memory stores additional computer code which, when executed by the onboard vehicle computer system causes the onboard vehicle computer system to generate position data describing a position where the visual feedback is displayed in an electronic display of the interface device and provide the position data and the graphical data to the interface device so that the visual feedback described by the graphical data is displayed at the position described by the position data. The system where the position data is operable so that the position where the visual feedback is displayed in the electronic display of the interface device does not obstruct an object which is being viewed by a driver of the HAV. Implementations of the described techniques may include hardware, a method or process, or computer software on a computer-accessible medium.

One general aspect includes a computer program product including a non-transitory memory of an onboard vehicle computer system of a HAV storing computer-executable code that, when executed by the onboard vehicle computer system, causes the onboard vehicle computer system to: analyze external sensor data recorded by one or more external sensors of the HAV to identify a traffic situation, where the external sensor data describes one or more measurements of a physical environment external to the HAV; generate graphical data describing visual feedback that visually depicts information describing the traffic situation; and provide, by a processor of the HAV, the graphical data to an interface device to cause the interface device to display the visual feedback, where the interface device is communicatively coupled to the HAV and operable to receive the graphical data from the processor of the HAV. Other embodiments of this aspect include corresponding computer systems, apparatus, and computer programs recorded on one or more computer storage devices, each configured to perform the actions of the methods.

Implementations may include one or more of the following features. The computer program product where the interface device is an AR display device and the graphical data is operable to cause the AR display device to provide an augmented reality experience. The computer program product where the AR display device is selected from a group that includes: a set of AR goggles; and a set of AR glasses. The computer program product where the AR display device is a 3D-HUD which is an element of the HAV. The computer program product where the interface device is selected from a group that includes: a smartphone; a laptop; a tablet computer; an e-book reader; and a smartwatch. The computer program product where the non-transitory memory stores additional computer code which, when executed by the onboard vehicle computer system causes the onboard vehicle computer system to generate position data describing a position where the visual feedback is displayed in an electronic display of the interface device and provide the position data and the graphical data to the interface device so that the visual feedback described by the graphical data is displayed at the position described by the position data. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1A:
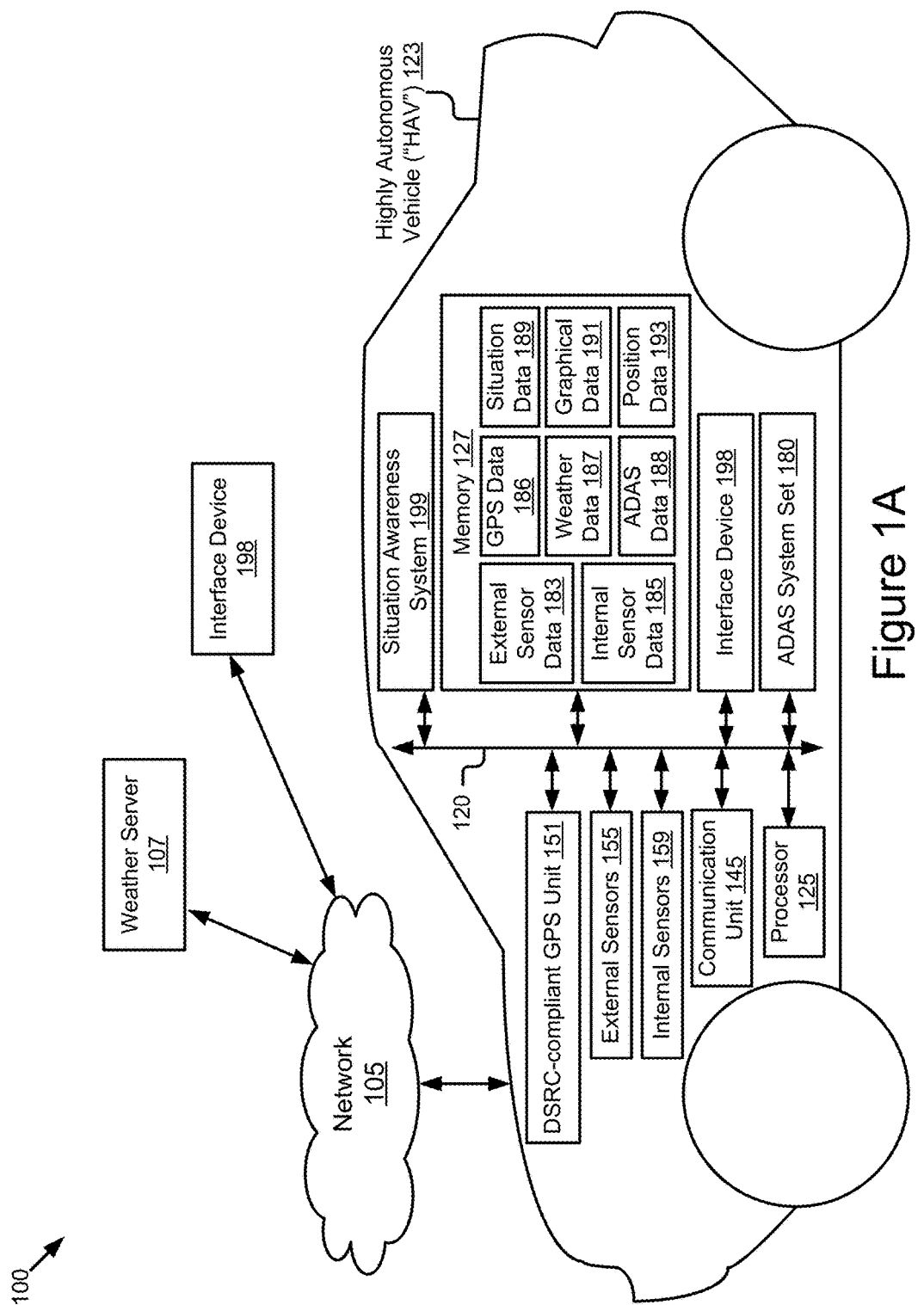
FIG. 1A is a block diagram illustrating an operating environment for a situation awareness system of a HAV according to some embodiments.

Described herein are embodiments of the situation awareness system. The situation awareness system is an element of an autonomous vehicle. In some embodiments, the situation awareness system is an element of an HAV. For example, an autonomous vehicle including the situation awareness system includes a set of ADAS systems which provide the autonomous vehicle with autonomous features which are Level 3 or higher as defined by the NHTSA.

When an autonomous vehicle is operating in Level 3 or higher (as described above), it is likely that the driver is not looking forward or monitoring the traffic situation, and as such, they do not know that the autonomous vehicle is about to enter a traffic situation which requires their assistance. For example, the driver may be playing a game on their phone or reading a book while their autonomous vehicle handles their morning commute to work. Drivers also do not want to look away from their personal activities (e.g., their game or book) in order to monitor the traffic situation during critical moments. The situation awareness system described herein is operable to keep the driver of an HAV informed of the traffic situation and notify them of traffic situations that require their attention (or may require their attention) without also requiring the driver to change their head orientation or look forward since doing so would require the driver to look away from their personal activities.

In some embodiments, the situation awareness system uses one or more external vehicle sensors of the HAV to monitor the current traffic situation. The external vehicle sensors measure the physical environment of the HAV and generates sensor data that describes these measurements. In this way the situation awareness system generates sensor data that describes the current traffic situation proximate to the HAV.

In some embodiments, the situation awareness system analyses the sensor data to generate graphical data for causing the interface device to provide visual feedback to the driver via an electronic display of an interface device (e.g., the AR goggles, AR glasses or 3D-HUD may provide an AR experience describing the traffic situation, or the driver's smartphone, laptop or tablet computing device may provide a notification describing the traffic situation).

In some embodiments, the visual feedback provided by the situation awareness system describes one or more of the following: (1) the traffic situation; (2) an estimate of the current danger level caused by the traffic situation; and (3) a recommended action by the driver to mitigate the danger level.

In some embodiments, the situation awareness system is operable to detect when the driver of the HAV changes their view type and modify the visual feedback accordingly. For example, the situation awareness system detects when the driver of the vehicle changes from a view type that is other than forward looking (e.g., looking at a book, smartphone, laptop, tablet computing device, out the side window or speaking to a passenger) to a view type that is forward looking (e.g., looking substantially forward through the front windshield of the HAV). Responsive to detecting the change in view type, the situation awareness system then switches from displaying the visual feedback via the smartphone, laptop or tablet computing device (which is what the driver may be viewing when they are in a view type that is other than forward looking) to displaying the visual feedback via a 3D-HUD (which is what the driver may be viewing when they are in a view type that is forward looking).

In another example, the driver may be wearing AR goggles while in a view type that is other than forward looking and the situation awareness system causes the AR goggles to display a first type of visual feedback and then, responsive to the driver switching to a view type that is forward looking, the situation awareness system causes the AR goggles to display a second type of visual feedback. See, e.g., FIG. 1B.

In some embodiments, the situation awareness system determines the object of the driver's attention and positions the visual feedback within the electronic display of the interface device so that the visual feedback does not obstruct the object of the driver's attention. See, e.g., FIGS. 4A and 4B.

In some embodiments, the situation awareness system monitors for unusual traffic situations which require the driver's attention. In these situations, the situation awareness system alerts the driver about the unusual traffic situation using the interface device when the driver would otherwise be distracted, thereby increasing the safety of the vehicle. See, e.g., FIGS. 4A, 4B and 5A-5C.

In some embodiments, the situation awareness system analyzes the current driving situation to determine whether the driver is currently at risk. See, e.g., FIG. 3. If the situation awareness system determines that the driver is not at risk, then then the situation awareness system causes the interface device to depict visual feedback that includes a message indicating that the current situation is safe. Our research indicates that this visual feedback is beneficial, for example, because it makes the driver feel safer and therefore less anxious when compared to their condition without the visual feedback. Our research indicates that some drivers do not feel safe, and therefore feel anxious, when traveling in an HAV because they do not necessarily trust the HAV in all driving situations, and this visual feedback addresses this problem. As a result, the driver of the HAV which includes the situation awareness system will be more likely to enjoy themselves by engaging in other activities (e.g., book reading, playing games on their smartphone, etc.) besides worrying about whether they are safe and constantly wanting to check the road.

In some embodiments, the situation awareness system determines that the driver is at risk, and the situation awareness system provides one or more of the following functionality: (1) the situation awareness system controls the operation of the interface device to cause the interface device to display a visual notification including a warning of the risk; and (2) the situation awareness system controls the operation of one or more ADAS systems of the HAV to cause these one or more ADAS systems to initiate remedial action appropriate to the current risk to the driver or the vehicle.

In some embodiments, the visual feedback provided by the situation awareness system is configured so that it is viewable by the driver in their peripheral vision, e.g., in the corner of their eyes when they are not looking forward. In this way the driver can notice that the traffic situation is getting dangerous without ever changing their posture. The driver can then react to the situation when the danger exceeds their comfort level or when the situation awareness system prompts them to intervene via the visual feedback.

Example Operating Environment

Referring to FIG. 1A, depicted is an operating environment 100 for a situation awareness system 199 of a HAV 123 according to some embodiments.

The operating environment 100 may include one or more of the HAV 123, a weather server 107 and an interface device 198. These elements may be communicatively coupled to one another via a network 105. Although one HAV 123, one weather server 107, one interface device 198 and one network 105 are depicted in FIG. 1A, in practice the operating environment 100 may include one or more HAVs 123, one or more weather servers 107, one or more interface device 198 and one or more networks 105.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, dedicated short range communication ("DSRC"), full-duplex wireless communication, etc. The network 105 may also include a mobile data network that may include 3G, 4G, LTE, LTE-V2X, VoLTE or any other mobile data network or combination of mobile data networks. Further, the network 105 may include one or more IEEE 802.11 wireless networks.

In some embodiments, the HAV 123 is a DSRC-equipped autonomous vehicle. The network 105 may include one or more communication channels shared among the HAV 123 and the weather server 107. The communication channel may include DSRC, LTE vehicle to everything (V2X), full-duplex wireless communication or any other wireless communication protocol. For example, the network 105 may be used to transmit a DSRC message, a DSRC probe, a basic safety message (BSM) or a full-duplex message including any of the data described herein.

The HAV 123 is any type autonomous vehicle having an ADAS system set 180 operating at Level 3 or greater. For example, the HAV 123 is one of the following types of HAV 123: a car; a truck; a sports utility vehicle; a bus; a semi-truck; a drone or any other roadway-based conveyance.

In some embodiments, the HAV 123 includes one or more of the following elements: a processor 125; a memory 127; a communication unit 145; a DSRC-compliant GPS unit 151; external sensors 155; internal sensors 159; the ADAS system set 180; an interface device 198; and a situation awareness system 199. These elements of the HAV 123 are communicatively coupled to one another via a bus 120.
HAV 123

In some embodiments, the processor 125 and the memory 127 are elements of an onboard vehicle computer system (such as computer system 200 described below with reference to FIG. 2).

In some embodiments, the onboard vehicle computer system is operable to cause or control the operation of the situation awareness system 199. The onboard vehicle computer system is operable to access and execute the data stored on the memory 127 to provide the functionality described herein for the situation awareness system 199 or its elements (see, e.g., FIG. 2). The onboard vehicle computer system is operable execute the situation awareness system 199 which causes the onboard vehicle computer system to execute one or more of the steps of the method 700 described below with reference to FIGS. 7A and 7B.

In some embodiments, the DSRC-compliant GPS unit 151 is operable to retrieve GPS data 186 that describes one or more locations of the HAV 123 at one or more different times. The GPS data 186 may be timestamped to indicate the time when the HAV 123 was at this particular location.

In some embodiments, the DSRC-compliant GPS unit 151 includes any hardware or software necessary to make the HAV 123 or the DSRC-compliant GPS unit 151 compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

In some embodiments, the DSRC-compliant GPS unit 151 is operable to provide GPS data 186 describing the location of HAV 123 with lane-level accuracy. For example, the HAV 123 is traveling on a roadway of a roadway environment. Lane-level accuracy means that the location of the HAV 123 is described so accurately that the HAV's 123 lane of travel may be accurately determined. In the context of the situation awareness system 199, lane-level accuracy enables the situation awareness system 199 to more accurately determine situation data 189 and the danger level (see, e.g., FIG. 3 and the overall danger level 305) for the HAV 123 caused by the activities of other tangible objects relative to the HAV 123. As used herein "other tangible objects" include, for example: other vehicles on the roadway or within the roadway environment; animals on the roadway or within the roadway environment; debris on the roadway or within the roadway environment; liquids on the roadway or within the roadway environment; and gases affecting the roadway or within the roadway environment, etc.

In some embodiments, the DSRC-compliant GPS unit 151 includes hardware that wirelessly communicates with a GPS satellite to retrieve GPS data 186 that describes a location of the HAV 123 with a precision that is compliant with the DSRC standard. The DSRC standard requires that GPS data 186 be precise enough to infer if two vehicles (one of which is, for example, the HAV 123) are in the same lane at the same time. The lane may be a lane of a roadway. In some embodiments, the DSRC-compliant GPS unit 151 is operable to identify, monitor and track its two-dimensional position within 1.5 meters of its actual position 68% of the time under an open sky. Since lanes of a roadway are typically no less than 3 meters wide, whenever the two-dimensional error of the GPS data 186 is less than 1.5 meters the situation awareness system 199 described herein may analyze the GPS data 186 provided by the DSRC-compliant GPS unit 151 and determine what lane of the roadway the HAV 123 is traveling in based on the relative positions of two or more different vehicles (one of which is, for example, the HAV 123) on the roadway at the same time.

By comparison to the DSRC-compliant GPS unit 151, a conventional GPS unit which is not compliant with the DSRC standard is unable to determine the location of a HAV 123 with lane-level accuracy. For example, a typical lane of a roadway is approximately 3 meters wide. However, a conventional GPS unit only has an accuracy of plus or minus 10 meters relative to the actual location of the HAV 123. As a result, such conventional GPS units are not sufficiently accurate for use by the situation awareness system 199 in some embodiments since they would not accurately reflect the lane in which the HAV 123 is located, and eventually result in the situation awareness system 199 either (1)

alerting the driver of a travel situation which is not sufficiently dangerous to merit the driver's attention or (2) failing to alert the driver of a travel situation which they should have been alerted based on the design goals and specification for the situation awareness system 199, both of which would eventually cause the driver of the HAV 123 to not trust the operation of the situation awareness system 199, thereby undermining the purpose of the situation awareness system 199 and rendering it not sufficiently reliable by drivers of the HAV 123.

In some embodiments, the DSRC-compliant GPS unit 151 includes functionality to provide navigation assistance to the HAV 123 or the driver of the HAV 123.

The external sensors 155 include one or more sensors that are operable to measure the physical environment outside of the HAV 123. For example, the external sensors 155 may record one or more physical characteristics of the physical environment that is proximate to the HAV 123. The sensors of the external sensors 155 may generate external sensor data 183. The external sensor data 183 may describe the recordings measured by the external sensors 155. For example, the external sensors 155 may store images captured by the external sensors 155, such as images captured by cameras, as external sensor data 183 in the memory 127.

In some embodiments, the external sensors 155 may include one or more of the following vehicle sensors: a camera; a LIDAR sensor; a radar sensor; a laser altimeter; an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor. The external sensor data 183 describes any measurements which are recorded by one or more of these external sensors 155.

The internal sensors 159 are sensors that monitor and measure a head position of the driver to generate head position data that describes the head position of the driver. In some embodiments, the internal sensors 159 are part of the interface device 198. For example, the interface device 198 is a 3D-HUD that includes embedded internal sensors 159 that monitor and measure the head position of the driver to generate head position data that is used to generate the position data 193. The head position data is an element of the internal sensor data 185. The position data 193 describes where visual feedback is displayed within the electronic display of the interface device 198. For example, the position data 193 describes where a graphic (e.g., an example of visual feedback) is displayed within a display area of an interface device such as a 3D-HUD, AR goggles, AR glasses, smartphone, smartwatch, laptop, e-book reader, etc.

In some embodiments, the head position data describes the orientation of the driver's head while the driver is wearing the interface device 198. For example, the head position data may include rotation vectors including roll, pitch, and yaw coordinates. The situation awareness system 199 determines, based on the head position data described by the internal sensor data 185, where the driver is looking and how to instruct the interface device 198 to position the visual feedback generated by the situation awareness system 199 and described by the graphical data 191. This is an example of the situation awareness system 199 determining position data 193 based on the head position data according to some embodiments.

In some embodiments, the internal sensors 159 monitor what the driver is viewing (e.g., any viewable object) and generate internal sensor data 185 that describes a subset of a viewable area of the electronic display of the interface device 198 which is ineligible for displaying visual feedback generated by the situation awareness system 199. The situation awareness system 199 generates position data 193 based on the internal sensor data 185 which is configured so that visual feedback is displayed in an area of the electronic display which does not include the subset described by the internal sensor data 185. In this way, the internal sensor data 185 beneficially ensures that the visual feedback does not visually obscure an object which has the attention of the driver. See, e.g., FIGS. 4A, 4B and 5A. The electronic display of the interface device 198 is transparent (or substantially transparent) if the interface device 198 is an AR display device but may be non-transparent if the interface device 198 is not an AR display device (e.g., if the interface device 198 is a smartphone, laptop, tablet computer, smartwatch, e-reader, etc.).

In some embodiments, the internal sensors 159 include one or more cameras, range finders, or other sensors which are operable to identify and track the head position of the driver or track which objects the driver is viewing.

In some embodiments, the internal sensors 159 monitor the driver to track whether the view type of the driver changes over time. The changes in the view type of the driver are described by the internal sensor data 185. The situation awareness system 199 monitors the internal sensor data 185 for changes in the view type of the driver. If the situation awareness system 199 detects a change in the view type of the driver, then the situation awareness system 199, when executed by the processor 125, causes the processor 125 to execute one or more of the following steps: modifying the visual feedback displayed by the interface device 198; modifying the placement of the visual feedback displayed by the interface device 198; and modifying which interface device 198 is used for providing the visual feedback to the driver. See, e.g., FIG. 1B. For example, assume the driver is looking at their smartphone (which in this example, is their first interface device 198), and the situation awareness system 199 causes the smartphone to display a first visual feedback for a traffic situation (see, e.g., FIG. 5B). If at a later time the driver changes their view type so that they are looking at their laptop, then the situation awareness system 199 stops causing the smartphone to display the first visual feedback and starts causing the laptop (which is now a second interface device 198) to display a second visual feedback for the traffic situation. If the driver subsequently changes their view type again so that they are facing the front windshield of the HAV 123, then the situation awareness system 199 stops causing the laptop to display the second visual feedback and starts causing an AR display device (which is now a third interface device 198) to display a third visual feedback for the traffic situation. Hooks in the operating system of the interface device 198 may assist the situation awareness system 199 to identify changes in the view type of the driver.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. The HAV 123 may include one or more processors 125. Other processors, operating systems, sensors, displays, and physical configurations may be possible. In some embodiments, the one or more processors 125 are an element of an onboard vehicle computer or electronic control unit (ECU) of the HAV 123.

The memory 127 is a non-transitory storage medium that stores instructions or data that may accessed and executed by the processor 125. The instructions or data may include code for performing the techniques described herein. The memory 127 may be a dynamic random-access memory (DRAM) device, a static random-access memory (SRAM) device, flash memory, or some other memory device. In some embodiments, the memory 127 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis. A portion of the memory 127 may be reserved for use as a buffer or virtual random-access memory (virtual RAM). The HAV 123 may include one or more memories 127.

The memory 127 of the HAV 123 may store one or more of the following elements: external sensor data 183; internal sensor data 185; GPS data 186; weather data 187; ADAS data 188; situation data 189; graphical data 191; and position data 193. These elements of the memory 127 are described below.

The external sensor data 183 describes the measurements recorded by the external sensors 155 of the HAV 123.

In some embodiments, the external sensor data 183 is provided as an input to one or more of the ADAS system set 180 and the situation awareness system 199 and used to generate outputs based on at least in part on this input.

In some embodiments, the situation awareness system 199 receives one or more inputs and then generates, as an output, the situation data 189. The situation data 189 is generated by the situation awareness system 199 based on an analysis of the one or more inputs to the situation awareness system 199. The one or more inputs to the situation awareness system 199 include, for example, one or more of the following: the external sensor data 183; the GPS data 186; the weather data 187; and the ADAS data 188.

In some embodiments, the situation data 189 describes a current traffic situation which is indicated by analysis of the one or more inputs to the situation awareness system 199. For example, the situation awareness system 199 includes code and routines that, when executed by the processor 125, cause the processor 125 to execute one or more of the following steps: receiving one or more inputs to the situation awareness system 199; analyzing the one or more inputs to the situation awareness system 199 to determine the current traffic situation for the HAV 123 indicated by the one or more inputs to the situation awareness system; and generating, as an output, the situation data 189 describing the current traffic situation for the HAV 123. See, e.g., FIG. 8.

In some embodiments, the situation data 189 describes an estimated future traffic situation which is indicated by analysis of the one or more inputs to the situation awareness system 199. For example, the situation awareness system 199 includes code and routines that, when executed by the processor 125, cause the processor 125 to execute one or more of the following steps: receiving one or more inputs to the situation awareness system 199; analyzing the one or more inputs to the situation awareness system 199 to estimate the future traffic situation for the HAV 123; and generating, as an output, the situation data 189 describing an estimate of the future traffic situation for the HAV 123. See, e.g., FIG. 8.

In some embodiments, the ADAS system set 180 may receive one or more inputs and then generate, as an output, the ADAS data 188 which is generated based in part on the one or more inputs to the ADAS system set 180. The one or more inputs to the ADAS system set 180 include, for example, one or more of the following: the external sensor data 183; the GPS data 186; and the weather data 187. The ADAS data 188 describes one or more operations which one or more of the ADAS systems included in the ADAS system set 180 are presently executing or plan to execute responsive to the one or more inputs to the ADAS system set 180.

The internal sensor data 185 describes the measurements recorded by the internal sensors 159 of the HAV 123. For example, the internal sensor data 185 includes the head position data describing the head position of the driver. In another example, the internal sensor data 185 describes which object the driver is currently viewing. The internal sensor data 185 may also describe a subset of the viewable area of an electronic display of the interface device 198 which overlaps the object which the driver is currently viewing such that this subset should not be included in the area described by the position data 193 (e.g., so that the visual feedback provided by the situation awareness system does not obscure the object which the driver is currently viewing, which may annoy the driver).

The graphical data 191 is digital data that describes visual feedback provided by the situation awareness system to the driver of the HAV 123 using the interface device 198. An example of the visual feedback described by the graphical data 191 includes a graphic which is displayed by an electronic display of the interface device 198 based on instructions provided by the situation awareness system 199 to the interface device 198. For example, the graphical data 191 describes a graphic displayed on an electronic display of the interface device 198 responsive to the situation awareness system 199 providing the graphical data 191 to the interface device 198 to cause the interface device 198 to display the graphic described by the graphical data 191. See, e.g., FIG. 8.

In some embodiments, the visual feedback described by the graphical data 191 describes one or more of the following information for the driver of the HAV 123: (1) the traffic situation (e.g., the current traffic situation or estimates of the future traffic situation) described by the situation data 189; (2) an estimated danger level which is associated with the traffic situation and described by the situation data 189; and (3) a recommended action by the driver in response to the traffic situation (which may also be included in the situation data 189). Examples of the visual feedback are included in FIGS. 1B, 3, 4A, 4B, 5A, 5B and 5C. Due to space constraints, these examples of visual feedback do not include all the information described in this paragraph. Accordingly, these examples of visual feedback included in FIGS. 1B, 3, 4A, 4B, 5A, 5B and 5C are not intended to be limiting due to their not including all the information described in this paragraph.

In some embodiments, the situation awareness system is operable to provide the visual feedback described by the graphical data 191 on a real-time or substantially real-time basis when measured relative to the time that the situation awareness system 199 identifies the traffic situation which triggers the generation of the graphical data 191.

In some embodiments, the graphical data 191 is operable to cause the interface device 198 to provide an AR experience to the driver of the HAV 123. See, for example, FIGS. 1B, 4A and 4B.

The GPS data 186 describes the geographical location of the HAV 123. In some embodiments, the GPS data 186 is received from the DSRC-compliant GPS unit 151 and describe the current location of the HAV 123 with such precision that the location of the HAV 123 within a particular lane is identified by the GPS data 186.

The weather data 187 describes the weather present at the geographical location of the HAV 123. For example, the communication unit 145 queries the weather server 107 via the network 105 for weather data 187 that describes the weather present at the geographical location of the HAV 123. The query includes the most recent or current GPS data 186 for the HAV 123. The weather server 107 returns weather data 187 associated with the geographical location described by the GPS data 186. For example, the weather server 107 includes a data structure that includes a list of geographic locations (described, for example, by latitude and longitude) and the weather conditions for these geographic locations. The weather server 107 receives the GPS data 186 and retrieves the weather data 187 associated with the geographic location described by the GPS data 186. The weather server 107 then transmits the weather data 187 to the communication unit 145 via the network 105. The communication unit 145 then stores the weather data 187 in the memory 127. This process may be repeated for each new instance of GPS data 186 or at some other interval.

The communication unit 145 transmits and receives data to and from a network 105 or to another communication channel. In some embodiments, the communication unit 145 may include a DSRC transceiver, a DSRC receiver and other hardware or software necessary to make the HAV 123 (or some other device such as the weather server 107 and the interface device 198) a DSRC-enabled device.

In some embodiments, the communication unit 145 includes a port for direct physical connection to the network 105 or to another communication channel. For example, the communication unit 145 includes a universal serial bus (USB), secure digital (SD), CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471,387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System."

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

The ADAS system set 180 may include one or more advanced driver assistance systems ("ADAS systems"). Examples of ADAS systems included in the ADAS system set 180 include one or more of the following elements of the HAV 123: an ACC system; an adaptive high beam system; an adaptive light control system; an automatic parking system; an automotive night vision system; a blind spot monitor; a collision avoidance system; a crosswind stabilization system; a driver drowsiness detection system; a driver monitoring system; an emergency driver assistance system; a forward collision warning system; an intersection assistance system; an intelligent speed adaption system; a lane departure warning system; a pedestrian protection system; a traffic sign recognition system; a turning assistant; and a wrong-way driving warning system. Each of these example ADAS systems provide their own features and functionality that may be referred to herein as a "ADAS feature" or an "ADAS functionality," respectively. The features and functionality provided by these example ADAS systems are also referred to herein as an "autonomous feature" or an "autonomous functionality," respectively. As depicted in FIG. 1A, the autonomous features and autonomous functionality provided by the ADAS systems of the ADAS system set 180 are sufficient to classify the vehicle which includes the situation awareness system 199 as a highly autonomous vehicle.

The interface device 198 includes one or more of the following: a 3D-HUD (see, e.g., FIG. 6 and the second visual feedback 170 depicted in FIG. 1B); a conventional AR display device such as an AR headset, AR goggles or AR glasses (see, e.g., FIGS. 4A, 4B and 5A); a smartphone (see, e.g., FIG. 5B); a laptop (see, e.g., FIG. 5C); an e-book reader; and any other electronic device having an electronic display, a communication unit that enables communication with the situation awareness system and application programming interfaces or graphical hooks which enable the situation awareness system 199 to control the operation of the electronic display to provide real-time or substantially real-time visual feedback to a user of the electronic device. Although only one interface device 198 is depicted in FIG. 1A as an element of the HAV, in practice the HAV 123 may include a plurality of interface devices 198.

In some embodiments, the interface device 198 includes one or more of the following example AR display devices: Google™ Glass; CastAR; Moverio BT-200; Meta; Vuzix M-100; Laster SeeThru; Icis; Optinvent ORA-S; GlassUP; Atheer One; K-Glass; and Microsoft™ Hololens.

In some embodiments, the electronic display of the interface device 198 is transparent or substantially transparent so that the driver of the HAV 123 can view the roadway environment or the cabin of the HAV 123 while also viewing the visual feedback provided by the situation awareness system 199 and displayed by the interface device 198. See, e.g., FIGS. 1B, 4A, 4B and 5A-5C. For example, the electronic display or the interface device 198 is transparent of substantially transparent.

In some embodiments, the interface device 198 is configured so that a driver of the HAV 123 can be focused on the driving experience when operating the HAV 123. In some embodiments, the interface device 198 includes one or more internal sensors 159 generates head position data that describes the orientation of the driver's head while the driver is wearing the interface device 198. In some embodiments, the interface device 198 may include additional equipment such as AR gloves which are operable to allow the driver to manipulate the position of the visual feedback displayed by the interface device 198 or provide a "touch-based" confirmation that the driver has seen the visual feedback (e.g., by "touching" the visual feedback which is displayed by the interface device 198).

Figure 6:
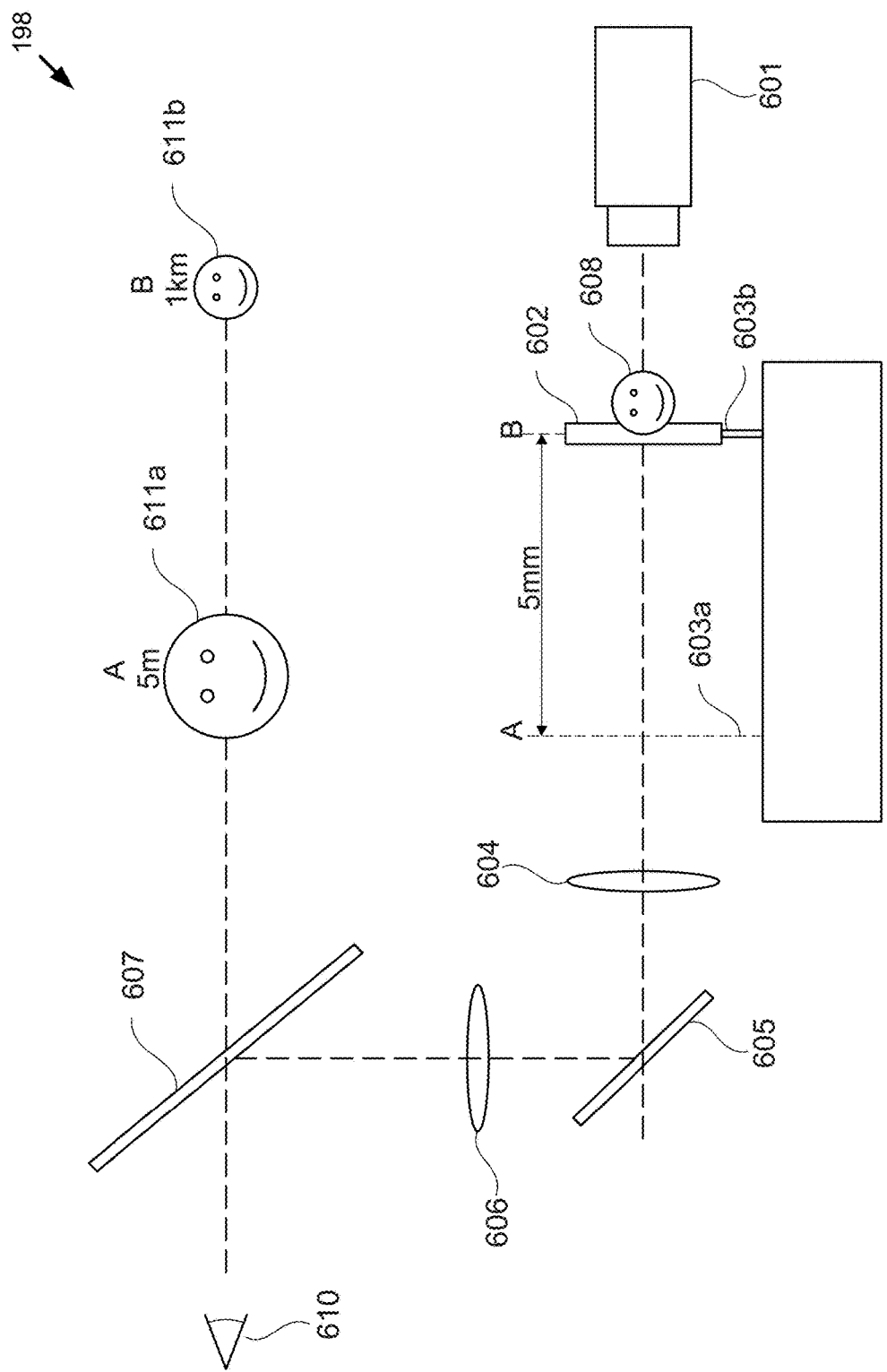
FIG. 6 is a block diagram illustrating a 3D-HUD according to some embodiments.

In some embodiments, the interface device 198 is a 3D-HUD. An example of the 3D-HUD is depicted in FIG. 6. For example, a driver of the HAV 123 may view the 3D-HUD and the 3D-HUD may display a graphical overlay which is described by the graphical data 191 and provides the visual feedback generated by the situation awareness system 199. Accordingly, the graphical data 191 may describe one or more three-dimensional graphical overlays which are operable to be displayed by a 3D-HUD such as the one depicted in FIG. 6. The 3D-HUD is described in more detail below with reference to FIG. 6.

As described in more detail below, the interface device 198 may include a non-transitory cache or buffer that temporarily stores data that it receives from the situation awareness system 199. For example, the non-transitory cache or buffer may store graphical data 191 which is predetermined by the situation awareness system 199 for frequently occurring traffic situations as determined by the situation awareness system 199 based on frequency. This functionality beneficial enables the visual feedback for frequently occurring traffic situations to be displayed in amount of time that more closely resembles real-time or near real-time.

As shown in FIG. 1A, in some embodiments the interface device 198 may be a network-enabled device which is communicatively coupled to the situation awareness system 199 via the network 105 and the communication unit 145. For example, the interface device 198 may be a smartphone, laptop or some other network-enabled electronic device which is communicatively coupled to the HAV 123 via the network 105. This is an example reason why the interface device 198 is depicted twice in FIG. 1A, and also depicted in FIG. 1A using dashed lines. In practice, so long as the operating environment 100 always includes at least one interface device 198 (whether it be an element of the HAV 123 or communicatively coupled to the HAV 123 via the network 105), the operating environment 100 may include zero or more interface devices 198 which are communicatively to the HAV 123 via the network 105 and zero or more interface devices 198 which are an element of the HAV 123.

In some embodiments, the situation awareness system 199 may include code or routines which, when executed by the processor 125, cause the processor 125 to execute steps including one or more of the following: (1) causing the external sensors 155 to generate the external sensor data 183; (2) causing the DSRC-compliant GPS unit 151 to retrieve the GPS data 186; (3) causing the communication unit 145 to retrieve the weather data 187; (4) receiving the ADAS data 188; (5) determining situation data 189 describing one or more traffic situations that require the attention or intervention of the driver of the HAV 123 based on one or more of the external sensor data 183, the GPS data 186, the weather data 187 and the ADAS data 188; (6) determining graphical data 191 describing visual feedback for the one or more traffic situations (e.g., a visual notification, a graphic or a graphical overlay); (7) causing the internal sensors 159 to generate the internal sensor data 185; (8) determining position data 193 based on the internal sensor data 185; and (9) controlling the operation of an interface device 198 to cause the interface device to 198 display the visual feedback described by the graphical data 191 at a position within the viewable area of the electronic display of the interface device 198 which is described by the position data 193.

In some embodiments, the situation awareness system 199 includes code and routines that are operable, when executed by the processor 125, to cause the processor 125 to execute one or more steps of the process 150 described below with reference to FIG. 1B.

In some embodiments, the situation awareness system 199 includes code and routines that are operable, when executed by the processor 125, to cause the processor 125 to execute one or more steps of the method 700 described below with reference to FIGS. 7A and 7B.

In some embodiments, the situation awareness system 199 includes code and routines that are operable, when executed by the processor 125, to cause the processor 125 to execute one or more steps of the process 800 described below with reference to FIG. 8.

In some embodiments, the situation awareness system 199 of the HAV 123 may be implemented using hardware including a field-programmable gate array ("FPGA") or an application-specific integrated circuit ("ASIC"). In some other embodiments, the situation awareness system 199 may be implemented using a combination of hardware and software. The situation awareness system 199 may be stored in a combination of the devices (e.g., servers or other devices), or in one of the devices.

The situation awareness system 199 is described in more detail below with reference to FIGS. 1B, 2, 3, 4A, 4B, 5A-5C, 6, 7A, 7B and 8.

Weather Server 107

The weather server 107 is a processor-based computing device. For example, the weather server 107 may include one or more of the following types of processor-based computing devices: a personal computer; a laptop; a mainframe; or any other processor-based computing device that is operable to function as a server. The weather server 107 may include a hardware server.

In some embodiments, the weather server 107 includes one or more of the following elements: a processor; a non-transitory memory; and a communication unit. These elements of the weather server 107 are similar to those of the HAV 123. The non-transitory memory also stores code and routines that are operable to provide a weather service. The processor of the weather server 107 executes the code and routines stored on the non-transitory memory of the weather server 107 to provide the weather service.

In some embodiments, the weather service includes a software service that provides weather data 187 to network-enabled entities such as the HAV 123 and the interface device 198, according to some embodiments. The weather data 187 may be stored in the non-transitory memory of the weather server 107 and transmitted to network-enabled entities by the communication unit of the weather server 107. For example, the weather server 107 is a server that is communicatively coupled to the network 105 and is operable to provide weather data 187 to other entities that are communicatively coupled to the network 105.

Figure 1B:
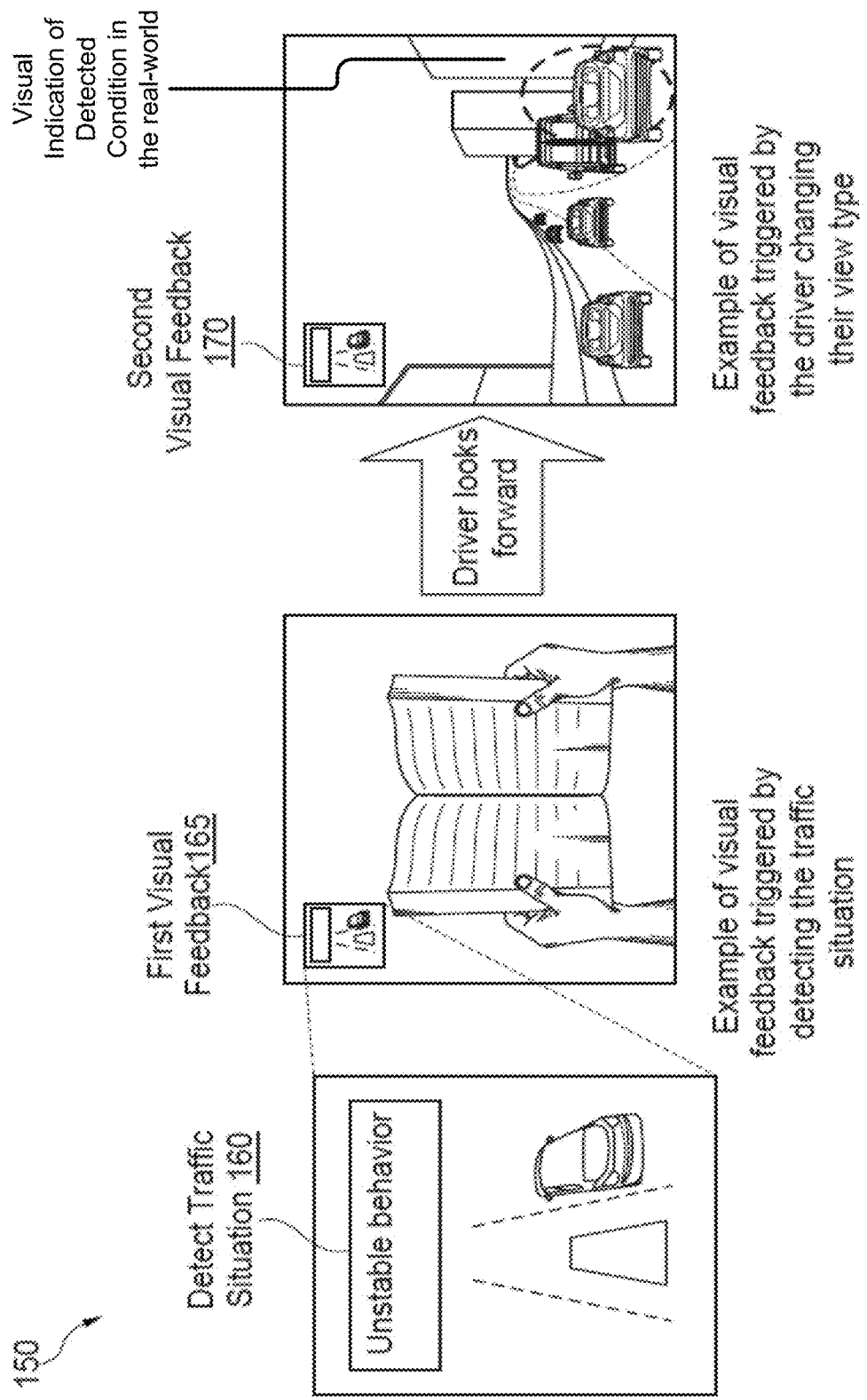
FIG. 1B is a block diagram illustrating a process for the situation awareness system of a HAV to provide a first visual feedback to a driver of the HAV when they are not looking forward and a second visual feedback to the driver when they are looking forward according to some embodiments.

Referring now to FIG. 1B, depicted is a block diagram illustrating a process 150 for the situation awareness system 199 of a HAV 123 to provide a first visual feedback 165 to the driver of the HAV 123 when they are not looking forward and a second visual feedback 170 to the driver when they are looking forward according to some embodiments.

Figure 3:
FIG. 3 includes a block diagram depicting a determination of an overall danger level for a traffic situation according to some embodiments.

As depicted, the situation awareness system 199 identifies a traffic situation 160. For example, a nearby vehicle is demonstrating unstable behavior whereby its future behaviors are difficult to predict. The situation awareness system 199 determines that the traffic situation 160 qualifies as a traffic situation which the driver of the HAV 123 should be made aware of (e.g., based on a determination of the danger level for the traffic situation 160, such as depicted in FIG. 3). The situation awareness system 199 determines that the driver of the HAV 123 is in a task view whereby they are not forward facing and are instead positioned to read a book. In the depicted example, the driver is wearing an AR display device such as AR goggles or AR glasses, which serves as a first interface device 198 in this example. The situation awareness system 199 causes the AR display device to display a first visual feedback 165 which includes a graphical depiction of the traffic situation 160 identified by the situation awareness system 199. In this way the driver of the HAV 123 is provided with information that enables them to see and understand the traffic situation even they are reading a book.

In the depicted example, the driver looks up from their book to a forward facing view type (here, this is referred to as a "return view") whereby the driver is looking through the windshield of the HAV 123 to see the real-world. The situation awareness system 199 detects the change in view type and causes either the AR display device or some other AR display device (e.g., a 3D-HUD installed in the windshield of the HAV 123) to display a second visual feedback 170 which (1) visually identifies the detected traffic situation 160 and (2) the vehicle in the real-world which is causing the detected traffic situation 160 (see, e.g., the graphical circle which is drawn around the real-world vehicle whose unstable behavior is causing the detected traffic situation 160).

Example Computer System

Figure 2:
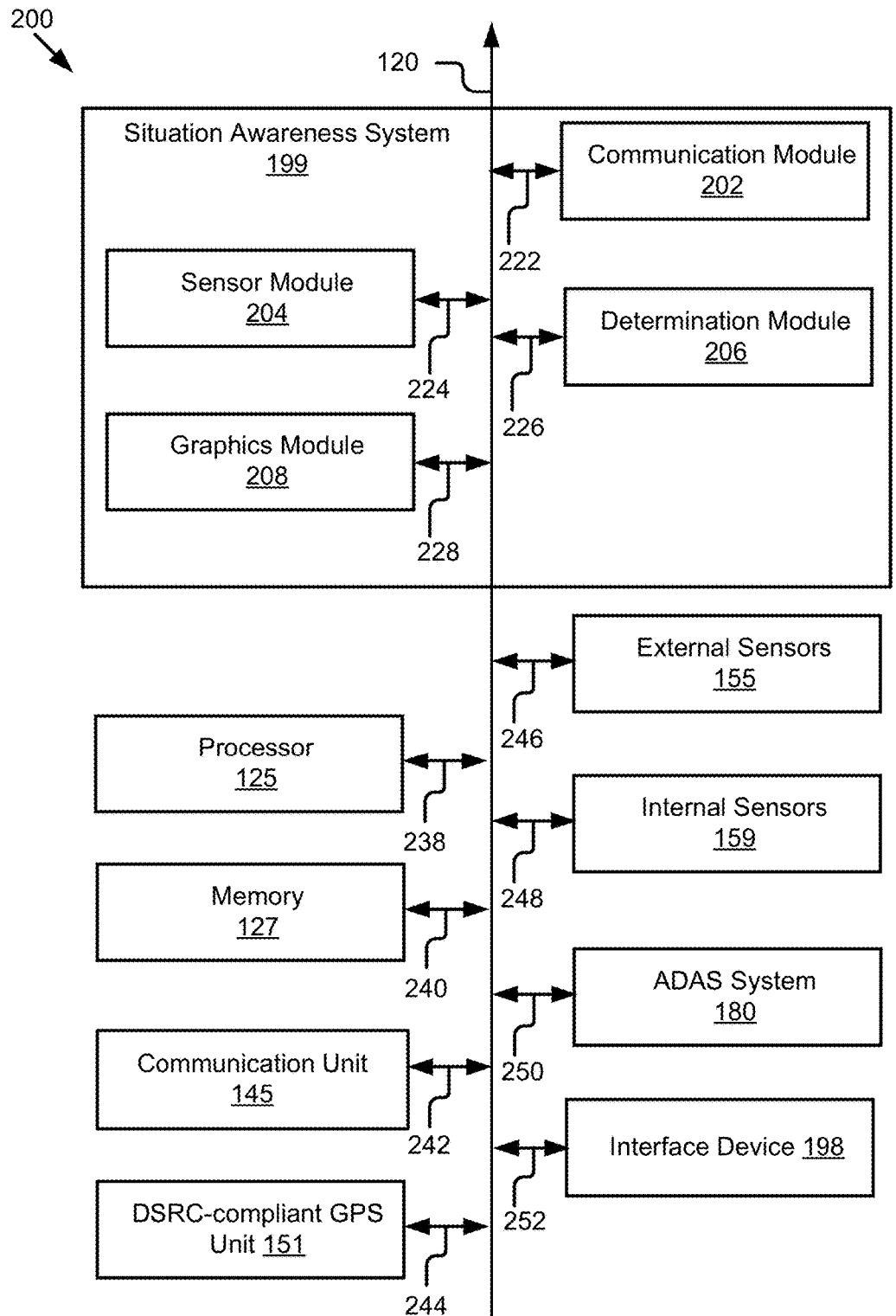
FIG. 2 is a block diagram illustrating an example computer system including the situation awareness system of an HAV according to some embodiments.

Referring now to FIG. 2, depicted is a block diagram illustrating an example computer system 200 including the situation awareness system 199 of the HAV 123 according to some embodiments.

In some embodiments, the computer system 200 may include a special-purpose computer system that is programmed to perform one or more steps of a method 700 described below with reference to FIGS. 7A and 7B, the process 800 described below with reference to FIG. 8 or the process 150 described above with reference to FIG. 1B.

In some embodiments, one or more components of the computer system 200 may be part of the weather server 107.

In some embodiments, the computer system 200 may be an onboard vehicle computer of the HAV 123.

In some embodiments, the computer system 200 may include an ECU, head unit or some other processor-based computing device of the HAV 123.

The computer system 200 may include one or more of the following elements according to some examples: the situation awareness system 199; the processor 125; the memory 127; the communication unit 145; the DSRC-compliant GPS unit 151; the external sensors 155; the internal sensors 159; the ADAS system set 180; and the interface device 198.

These components of the computer system 200 are communicatively coupled by the bus 120.

In the illustrated embodiment, the processor 125 is communicatively coupled to the bus 120 via a signal line 238. The memory 127 is communicatively coupled to the bus 120 via a signal line 240. The communication unit 145 is communicatively coupled to the bus 120 via a signal line 242. The DSRC-compliant GPS unit 151 is communicatively coupled to the bus 120 via a signal line 244. The external sensors 155 are communicatively coupled to the bus 120 via a signal line 246. The internal sensors 159 are communicatively coupled to the bus 120 via a signal line 248. The ADAS system set 180 is communicatively coupled to the bus 120 via a signal line 250. The interface device 198 is communicatively coupled to the bus 120 via a signal line 252.

The following elements of the computer system 200 were described above with reference to FIG. 1A, and so, those descriptions will not be repeated here: the processor 125; the memory 127; the communication unit 145; the DSRC-compliant GPS unit 151; the external sensors 155; the internal sensors 159; the ADAS system set 180; and the interface device 198.

The memory 127 may store any of the data described above with reference to FIG. 1A or below with reference to FIGS. 6, 7A, 7B and 8. The memory 127 may store any data needed for the computer system 200 to provide its functionality.

The situation awareness system 199 described herein with reference to FIG. 1A may include code and routines that is operable to "turn on" the ADAS software for a vehicle so that this ADAS software and its corresponding ADAS hardware are operable to provide some or all of the functionality of one or more ADAS systems of the ADAS system set 180.

In the illustrated embodiment shown in FIG. 2, the situation awareness system 199 includes a communication module 202, a sensor module 204, a determination module 206 and a graphics module 208.

The communication module 202 can be software including routines for handling communications between the situation awareness system 199 and other components of the computer system 200. In some embodiments, the communication module 202 can be a set of instructions executable by the processor 125 to provide the functionality described below for handling communications between the situation awareness system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100. For example, the communication module 202 receives or transmits, via the communication unit 145, any of the data stored in the memory 127 or messages described herein. The communication module 202 may send or receive any of the data or messages described herein via the communication unit 145.

In some embodiments, the communication module 202 receives data from components of the computer system 200 and stores the data in the memory 127 (or a buffer or cache of the interface device 198). For example, the communication module 202 receives any of the data described above with reference to the memory 127 from the communication unit 145 (via the network 105) and stores this data in the memory 127 (or a buffer or cache of the interface device 198).

In some embodiments, the communication module 202 may handle communications between components of the situation awareness system 199. For example, the communication module 202 may transmit external sensor data 183 or internal sensor data 185 from the sensor module 204 to the determination module 206 (or any other module of the situation awareness system 199.

The sensor module 204 can be software including routines for controlling the operation of the external sensors 155 and the internal sensors 159 and generating the external sensor data 183 and the internal sensor data 185. In some embodiments, the sensor module 204 can be a set of instructions executable by the processor 125 to provide the functionality described herein for generating the external sensor data 183 and the internal sensor data 185 and causing the communication module 202 to provide the external sensor data 183 and the internal sensor data 185 to the determination module 206. In some embodiments, the sensor module 204 can be stored in the memory 127 of the computer system 200 and can be accessible and executable by the processor 125. The sensor module 204 may be adapted for cooperation and communication with the processor 125 and other components of the computer system 200 via signal line 224.

The sensor module 204 receives external sensor data 183 from the external sensors 155 or retrieves the external sensor data 183 from the memory 127. For example, the sensor module 204 receives images of the road in front of the HAV 123.

The sensor module 204 receives internal sensor data 185 from the internal sensors 159 or retrieves the internal sensor data 185 from the memory 127. For example, the sensor module 204 receives images of the driver or the objects being viewed by the driver.

In some embodiments, the sensor module 204 can be software including routines for controlling the operation of the DSRC-compliant GPS unit 151 and causing the GPS data 186 to be received by the DSRC-compliant GPS unit 151. In some embodiments, the sensor module 204 can be a set of instructions executable by the processor 125 to provide the functionality described herein for retrieving the GPS data 186 and causing the communication module 202 to provide the GPS data 186 to the determination module 206.

In some embodiments, the sensor module 204 can be software including routines for controlling the operation of the communication unit 145 and causing the weather data 187 to be received by the communication unit 145 from the network 105. In some embodiments, the sensor module 204 can be a set of instructions executable by the processor 125 to provide the functionality described herein for causing the weather data 187 to be received from the network 105 and causing the communication module 202 to provide the weather data 187 to the determination module 206.

In some embodiments, the sensor module 204 can be software including routines for causing the communication module 202 to provide inputs to one or more ADAS systems of the ADAS system set 180 and receive the ADAS data 188 as an output from the one or more ADAS systems of the ADAS system set 180. The inputs provided to the one or more ADAS systems of the ADAS system set 180 include one or more of the following: the external sensor data 183; the GPS data 186; and the weather data 187. In some embodiments, the sensor module 204 can be a set of instructions executable by the processor 125 to provide the functionality described herein for causing the generation and receipt of the ADAS data 188 and causing the communication module 202 to provide the ADAS data 188 to the determination module 206.

The determination module 206 can be software including routines for generating situation data 189, view type data, interface data and position data 193 based on one or more inputs received from the communication module 202. The one or more inputs received from the communication module 202 include, for example, one or more of the following: the external sensor data 183; the internal sensor data 185; the GPS data 186; the weather data 187; and the ADAS data 188.

In some embodiments, the determination module 206 can be a set of instructions executable by the processor 125 to provide the functionality described above and below for generating the situation data 189, generating the view type data, generating the interface data, generating the position data 193, detecting changes in the view type of the driver, detecting which object is being viewed by the driver, detecting events whereby the driver switches from using or viewing one interface device 198 to using or viewing a different interface device 198, etc.

In some embodiments, the determination module 206 can be a set of instructions executable by the processor 125 to provide the functionality for receiving the internal sensor data 185 and determining, based on the internal sensor data 185, view type data describing a view type for the driver. For example, the determination module 206 may analyze the internal sensor data 185 to determine whether the driver is in a task view, a return view, a view type that is forward facing, a view type that is other than forward facing or some other view type for the driver of the HAV 123. The determination module 206 then generates view type data that describes the driver's current view type. The determination module 206 may continuously analyze newly generated and received internal sensor data 185 to identify instances where the view type for the driver changes so that the graphical data 191 and the interface device 198 used for displaying the graphical data 191 can be modified accordingly.

In some embodiments, the determination module 206 can be a set of instructions executable by the processor 125 to provide the functionality for receiving interface data from the interface device 198. The interface data is digital data describing a type of interface device being used by the driver of the HAV 123. Optionally, if the type of interface device is an AR display device, the determination module 206 also receives an image of what the driver is viewing in the real-world as they are looking through the AR display device. This image is beneficial, for example, because it helps the determination module 206 to determine position data 193 which is configured to ensure that the visual feedback provided by the situation awareness system to does not obstruct an object being viewed by the driver of the HAV 123.

In some embodiments, the determination module 206 can be a set of instructions executable by the processor 125 to provide the functionality for determining position data 193 based on one or more of the internal sensor data 185, the view type data and the interface data.

In some embodiments, the determination module 206 may determine a recommendation for how the driver should respond to the traffic situation described by the situation data 189 based on a data structure stored in the memory 127 that describes a set of traffic situations and responses for the traffic situations included in the set of traffic situations. The recommendation may be included in the situation data 189.

In some embodiments, the determination module 206 includes routines for causing the communication module 202 to provide one or more of the situation data 189, the view type data, the interface data and the position data 193 to the graphics module 208 or the memory 127.

In some embodiments, the determination module 206 can be stored in the memory 127 of the computer system 200 and can be accessible and executable by the processor 125. The determination module 206 may be adapted for cooperation and communication with the processor 125 and other components of the computer system 200 via signal line 226.

The graphics module 208 can be software including routines for generating the graphical data 191. In some embodiments, the graphics module 208 can be a set of instructions executable by the processor 125 to provide the functionality described below for generating the graphical data 191 based on one or more of the situation data 189, view type data and the interface data. The view type described by the view type data and the interface type described by the interface data may affect the size and content of the visual feedback described by the graphical data 191. In some embodiments, the graphics module 208 can be stored in the memory 127 of the computer system 200 and can be accessible and executable by the processor 125. The graphics module 208 may be adapted for cooperation and communication with the processor 125 and other components of the computer system 200 via signal line 228.

In some embodiments, the graphics module 208 includes routines for causing the communication module 202 or the communication unit 145 to provide the graphical data 191 and the position data 193 to the interface device 198 described by the interface data, thereby causing the interface device 198 to display the visual feedback described by the graphical data 191 at a position described by the position data 193.

Referring now to FIG. 3, depicted is a block diagram depicting a determination 300 of an overall danger level 305 for a traffic situation according to some embodiments.

In some embodiments, the situation awareness system 199 does not provide visual feedback to the driver for each identified traffic situation. Instead, the situation awareness system 199: identifies one or more traffic situations during a predetermined time frame; determines an overall danger level 305 created by the one or more traffic situations identified during the predetermined time frame; and only provides visual feedback to the driver if the overall danger level 305 for the one or more traffic situations identified during this predetermined time meets a predetermined feedback threshold described by feedback threshold data which is stored in a non-transitory memory (e.g., the memory 127). This may be a sub-step to the situation awareness system identifying a traffic situation or generating situation data. For example, the situation awareness system 199 analyzes the external sensor data to identify one or more traffic situations (see, e.g., FIG. 1B) and then determines an overall danger level 305 for the predetermined time frame.

In some embodiments, the situation awareness system 199 may analyze the one or more traffic situation based on one or more danger level metrics. FIG. 3 depicts an example of six different danger level metrics: (1) the existence of surrounding vehicles and the number of surrounding vehicles; (2) the distance to the nearest vehicle [e.g., a stopping distance or some other distance]; (3) a presence of one or more pedestrians [or animals] in or near the road; (4) the existence of a dangerous vehicle [e.g., one exhibiting unstable behavior or some other behavior] near the ego vehicle [the ego vehicle is the HAV which includes the situation awareness system 199]; (5) the existence of a nearby vehicle which is determined by the situation awareness system to be likely to cause a traffic accident [e.g., based on an analysis by the situation awareness system 199 of one or more of the external sensor data, GPS data, weather data and ADAS data]; and (6) the danger associated with the particular road the ego vehicle is traveling on [e.g., the memory 127 stores a table that identifies roads having a history of an elevated number of accidents relative to other roads, and this table is compared to the GPS data by the situation awareness system 199 to identify if the HAV 123 is traveling on a dangerous road and what the relative danger is for this particular danger road relative to other roads].

FIG. 3 also depicts the determined danger level for each of these metrics based on the inputs to the situation awareness system 199, e.g., based on an analysis by the situation awareness system 199 of one or more of the external sensor data, GPS data, weather data and ADAS data. For example, the situation awareness system 199 determines that the danger level for metric (1), the existence of surrounding vehicles and the number of surrounding vehicles, is a "3" based on analysis of the inputs to the situation awareness system 199. The determination of the danger level for this metric includes the situation awareness system 199 outputting a reason for the danger level for each metric. For example, the reason for determining that the danger level for metric (1) is a "3" is that the number of surrounding vehicles (relative to the ego vehicle) exceeds a danger threshold which is stored in a non-transitory memory of the ego vehicle (e.g., memory 127) as surrounding vehicle threshold data. This is repeated for each of the danger level metrics considered by the situation awareness system 199. These reasons for determining the danger level may be included in the visual feedback which is provided by the situation awareness system 199.

FIG. 3 also depicts a determination of an overall danger level 305 for the predetermined time period. Here, the overall danger level 305 is the highest danger level for the one or more danger level metrics. In some embodiments, this overall danger level 305 must meet the predetermined feedback threshold described by feedback threshold data which is stored in the non-transitory memory (e.g., the memory 127).

In some embodiments, if the feedback threshold is not met, then the situation awareness system 199 determines that the driver will not be provided with visual feedback for the one or more identified traffic situations occurring during the predetermined time frame. If the feedback threshold is met, then the situation awareness system 199 determines that the driver will be provided with visual feedback for the one or more identified traffic situations occurring during the predetermined time frame. In some embodiments, this process is repeated for successive predetermined time frames, one occurring right after the other so that no moment in time is not included in the analysis provided by the situation awareness system 199 while the HAV 123 is operating. In this way the overall danger level assists the situation awareness system to identify whether the driver is provided with a visual feedback on an ongoing basis over a plurality of successive predetermined time frames while the HAV 123 is operating with no moment in time left unconsidered by the situation awareness system 199.

Figure 4A:
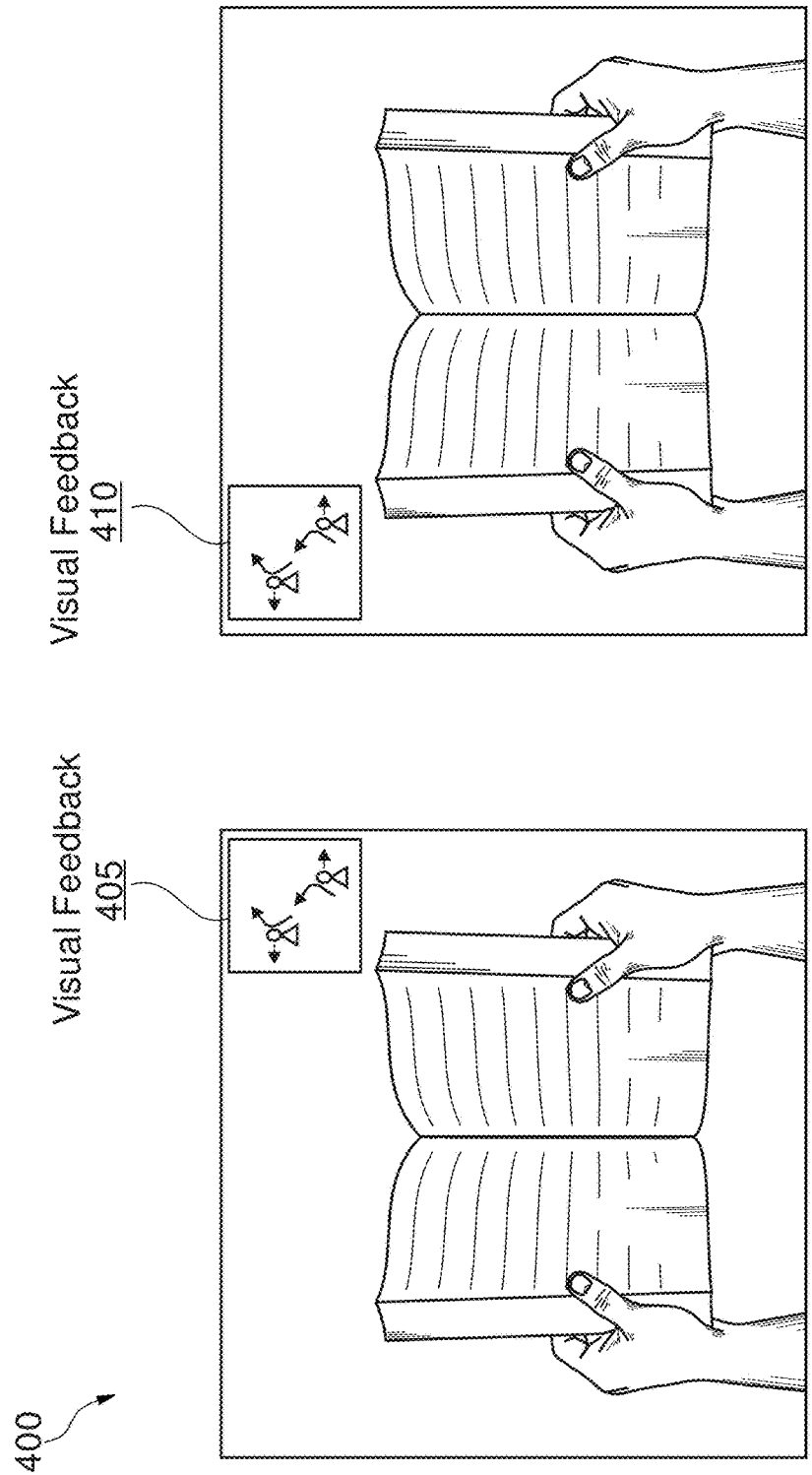
FIG. 4A is an example of a driver's view of visual feedback provided by the situation awareness system when looking through an interface device.

Referring now to FIG. 4A, depicted is an example of a driver's view 400 of visual feedback 405, 410 provided by the situation awareness system when looking through an interface device. In the depicted embodiment, the interface device is an AR display device such as AR googles or AR glasses. The position data for the visual feedback 405, 410 is configured so that the visual feedback 405, 410 does not obscure the object which the driver is viewing (e.g., a book) while in a task view (an example type of a non-forward-looking view type). Note that the visual feedback 405, 410 is provided by an AR display device such as AR glasses or AR goggles so that the driver is still provided with visual feedback while looking at a non-electric device such as a book.

In the depicted embodiment, the visual feedback 405 is provided by the situation awareness system 199 at a first time. The visual feedback 405 is positioned in the top right-hand corner of the viewable area of the AR display device. The driver shifts their arm position to the right, but not their head position, such that the visual feedback 405 would have obscured the driver's view of their book. The situation awareness system 199 analyses the internal sensor data to detect this change and then modifies the position data to generate the visual feedback 410 which is displayed on the top left-hand corner of the viewable area of the electronic display of the AR display device at a position which does not obscure the driver's view of the book. In the depicted embodiment, the internal sensor data is measured by one or more cameras installed in the AR display device to monitor what the driver is viewing in the real-world using the AR display device. The depicted embodiment also demonstrates how the driver can view the real-world as well as visual feedback in their peripheral vision at the same time.

Figure 4B:
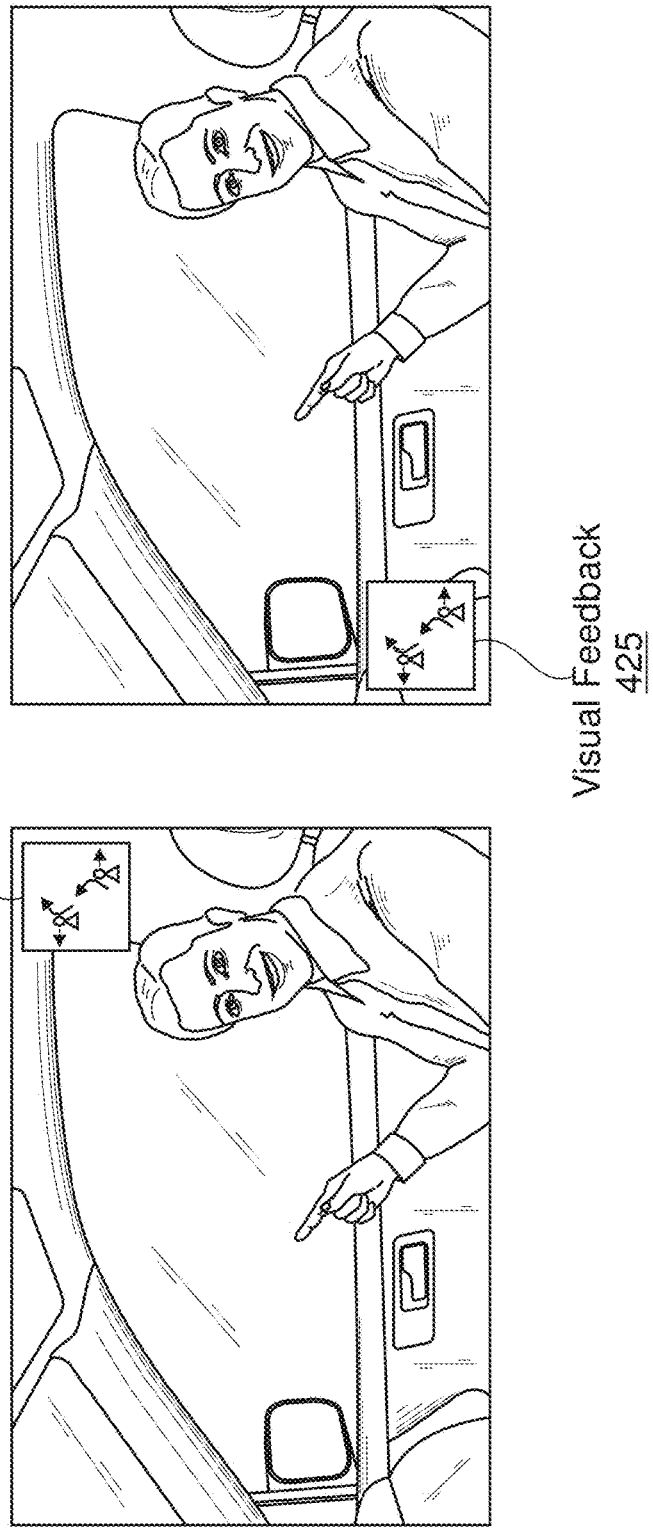
FIG. 4B is an example of a driver's view of visual feedback provided by the situation awareness system when looking through an interface device according to some embodiments.

Referring now to FIG. 4B, depicted is an example of a driver's view 450 of visual feedback 420, 425 provided by the situation awareness system 199 when looking through an interface device according to some embodiments. In the depicted embodiment, the interface device is an AR display device such as AR googles or AR glasses. The position data for the visual feedback 420, 425 is configured so that the visual feedback 420, 425 does not obscure the object which the driver is viewing (e.g., a passenger in the HAV 123) while in a non-forward-looking view type.

In the depicted embodiment, the visual feedback 420 is provided by the situation awareness system 199 at a first time. The visual feedback 420 is positioned in the top right-hand corner of the viewable area of the AR display device. The driver shifts their head position to the right such that the visual feedback 420 would have obscured the driver's view of the passenger. The situation awareness system 199 analyses the internal sensor data to detect this change and then modifies the position data to generate the visual feedback 425 which is displayed on the bottom left-hand corner of the viewable area of the electronic display of the AR display device at a position which does not obscure the driver's view of the passenger. In the depicted embodiment, the internal sensor data is measured by one or more cameras installed in the AR display device to monitor what the driver is viewing in the real-world using the AR display device. The depicted embodiment also demonstrates how the driver can view the real-world as well as visual feedback in their peripheral vision at the same time.

Figure 5A:
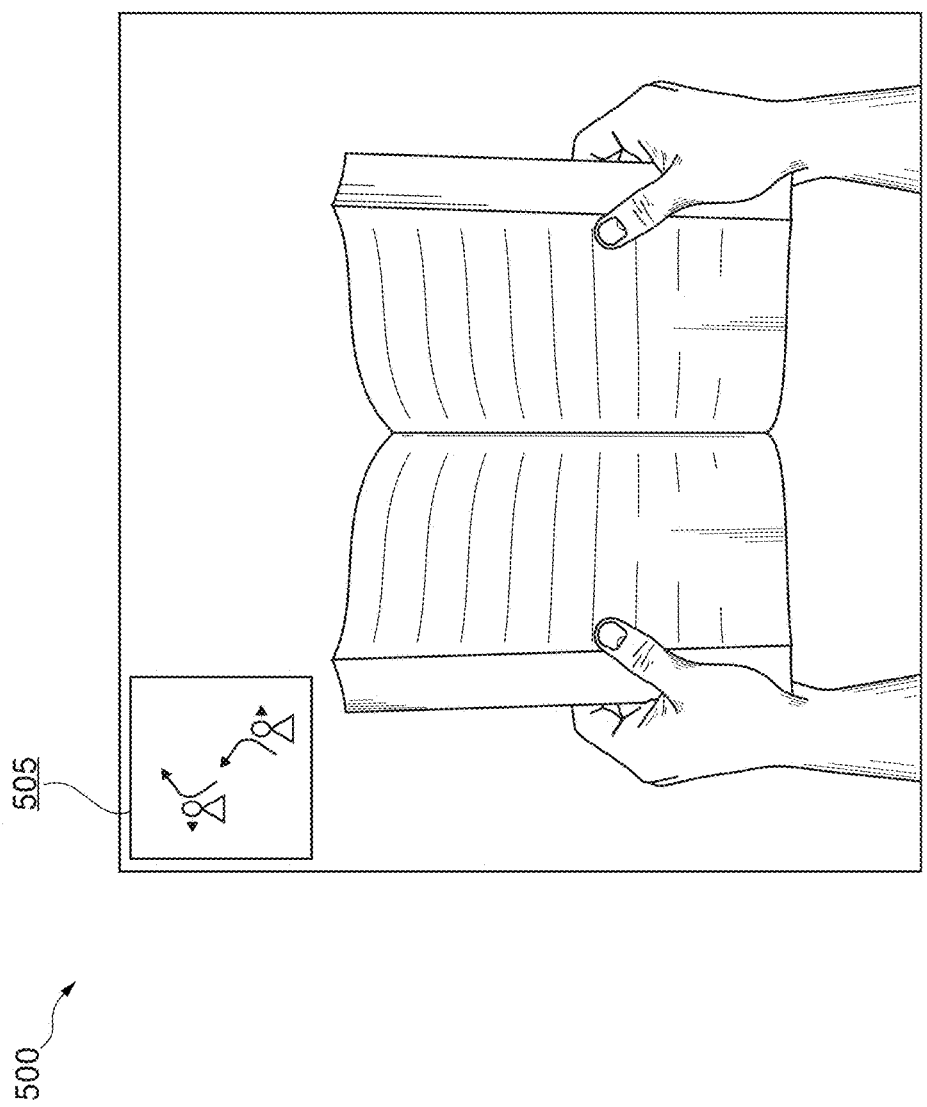
FIG. 5A is an example of a driver's view of visual feedback provided by the situation awareness system when looking through an interface device according to some embodiments.

Referring now to FIG. 5A, depicted is an example of a driver's view 500 of visual feedback 505 provided by the situation awareness system 199 when looking through an interface device according to some embodiments. In the depicted embodiment, the interface device is an AR display device such as AR googles or AR glasses. The visual feedback 505 is a graphical overlay that depicts information about the current traffic situation detected by the situation awareness system 199. In the depicted example, the visual feedback 505 is notifying the driver that they should prepare for a lateral force. In other words, the current traffic situation will cause the driver to experience a lateral force that will move them to the right and then the left.

Figure 5B:
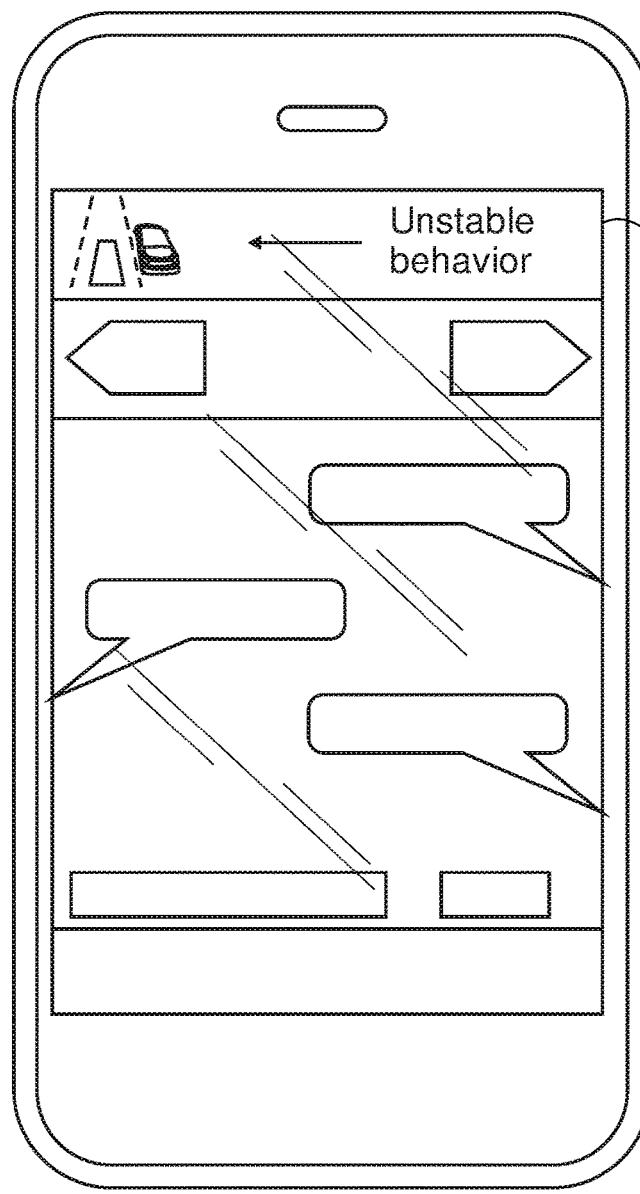
FIG. 5B is an example of a driver's view of visual feedback provided by the situation awareness system when looking at a smartphone according to some embodiments.

Referring now to FIG. 5B, depicted is an example of a driver's view 550 of visual feedback 510 provided by the situation awareness system 199 when looking at a smartphone according to some embodiments. In the depicted embodiment, the interface device is the smartphone. The visual feedback 510 is a graphical notification bar displayed by the smartphone that depicts the current traffic situation detected by the situation awareness system 199 as well as text that describes the current traffic situation. Here, the visual feedback 510 includes graphical text that includes the words "unstable behavior" and a graphical image that depicts the current traffic situation and includes an arrow pointing a neighboring vehicle which is (1) traveling to the immediate right of the HAV 123 in a neighboring lane of the real-world roadway and (2) demonstrating unstable behavior. In the depicted example, the visual feedback 510 is notifying the driver that they should either (1) intervene in the operation of the HAV 123 to respond to a traffic situation that includes the unstable behavior of a vehicle traveling in the immediately neighboring lane of travel of the right-hand side of the HAV 123 or (2) be prepared by the HAV 123 to take action to respond to this traffic situation. The visual feedback 510 is displayed at a position that does not obscure the driver's view of the texting application which the driver is currently viewing on their smartphone.

Figure 5C:
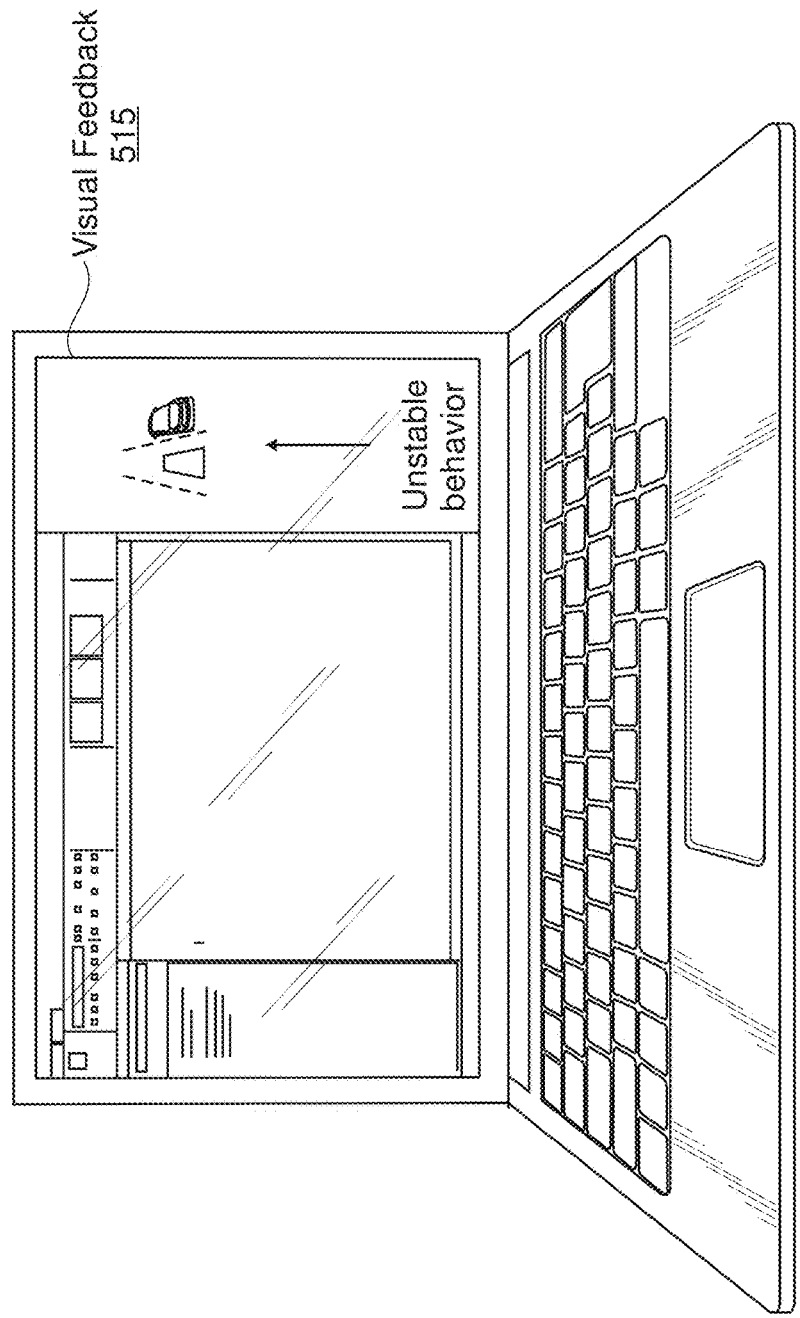
FIG. 5C is an example of a driver's view of visual feedback provided by the situation awareness system when looking at a laptop according to some embodiments.

Referring now to FIG. 5C, depicted is an example of a driver's view 575 of visual feedback 515 provided by the situation awareness system 199 when looking at a laptop according to some embodiments. In the depicted embodiment, the interface device is the laptop. The visual feedback 515 is a graphical notification bar displayed by the laptop that depicts the current traffic situation detected by the situation awareness system 199 as well as text that describes the current traffic situation. Here, the visual feedback 515 includes graphical text that includes the words "unstable behavior" and a graphical image that depicts the current traffic situation and includes an arrow pointing at a neighboring vehicle which is (1) traveling to the immediate right of the HAV 123 in a neighboring lane of the real-world roadway and (2) demonstrating unstable behavior. In the depicted example, the visual feedback 515 is notifying the driver that they should either (1) intervene in the operation of the HAV 123 to respond to a traffic situation that includes the unstable behavior of a vehicle traveling in the immediately neighboring lane of travel of the right-hand side of the HAV 123 or (2) be prepared by the HAV 123 to take action to respond to this traffic situation. The visual feedback 515 is displayed at a position that does not obscure driver's view of the word-processing application which the driver is currently viewing on their laptop.

Example 3D-HUD

Referring to FIG. 6, depicted is a block diagram illustrating an interface device 198 in embodiments where the interface device 198 is a 3D-HUD.

In some embodiments, the 3D-HUD includes a projector 601, a movable screen 602, a screen-driving unit 603, an optical system (including lenses 604, 606, a reflector 605, etc.). The projector 601 may be any kind of projector such as a digital mirror device (DMD) project, a liquid crystal projector. The projector 601 projects an image (graphic) 608 on the movable screen 602. The image 608 may include a graphical overlay. For example, the image 608 may be the graphical overlay depicting lane lines as described above with reference to FIG. 2.

The movable screen 602 includes a transparent plate and so the light of the projected image transmits through the movable screen 602 to be projected on the windshield 607 of a vehicle (e.g., the HAV 123). The image projected on the windshield 607 is perceived by a driver 610 as if it is a real object (shown as 611*a*, 611*b*) that exists in the three-dimensional space of the real-world, as opposed to an object that is projected on the windshield.

In some embodiments, the 3D-HUD is capable of controlling the direction of the image relative to the driver 610 (in other words, the image position in the windshield) by adjusting the projection position on the screen 602. Further the screen 602 is movable by the screen-driving unit 603 in the range between the positions 603*a* and 603*b*. Adjusting the position of the screen 602 can vary the depth (distance) of the projected image from the driver 610 in the real-world. In one example, the movable range of the screen 602 (distance between positions 603*a* and 603*b*) may be 5 mm, which correspond to from 5*m* away to infinity in the real-world. The use of the 3D-HUD allows the driver 610 to perceive the projected image exist in the real-world (three-dimensional space). For example, when an image is projected at the same three-dimensional position (or substantially same depth at least) as a real object (such as a pedestrian, car, etc.), the driver does not need to adjust eye focus in order to view the projected image, resulting in easy grasp of the projected image while looking at the real object.

The 3D-HUD depicted in FIG. 6 is provided by way of example. Other examples are possible. These examples may include heads-up displays having more or less complexity than the 3D-HUD depicted in FIG. 6. For example, it is anticipated that in the future there will be heads-up displays that do not require movable parts such as the movable screen 602. For example, a static screen that does not move may be deployed. The heads-up display deployed may not be a two-dimensional heads-up display unit. In some embodiments, the situation awareness system 199 and the graphical overlay is designed to be operable with such components.

Example Method

Figure 7A:
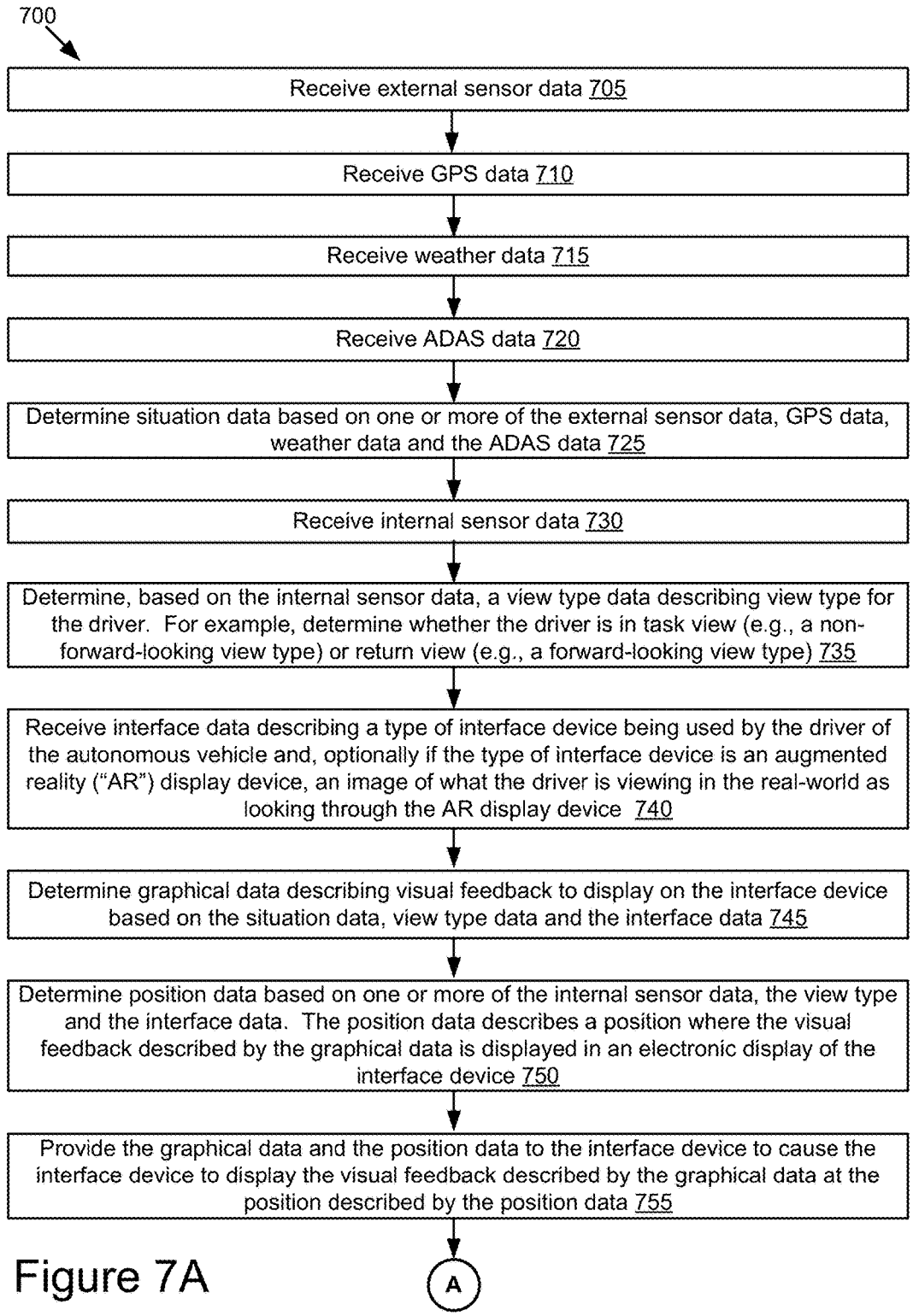
FIGS. 7A and 7B are an example flow diagram of a method for providing visual feedback according to some embodiments.
Figure 7B:
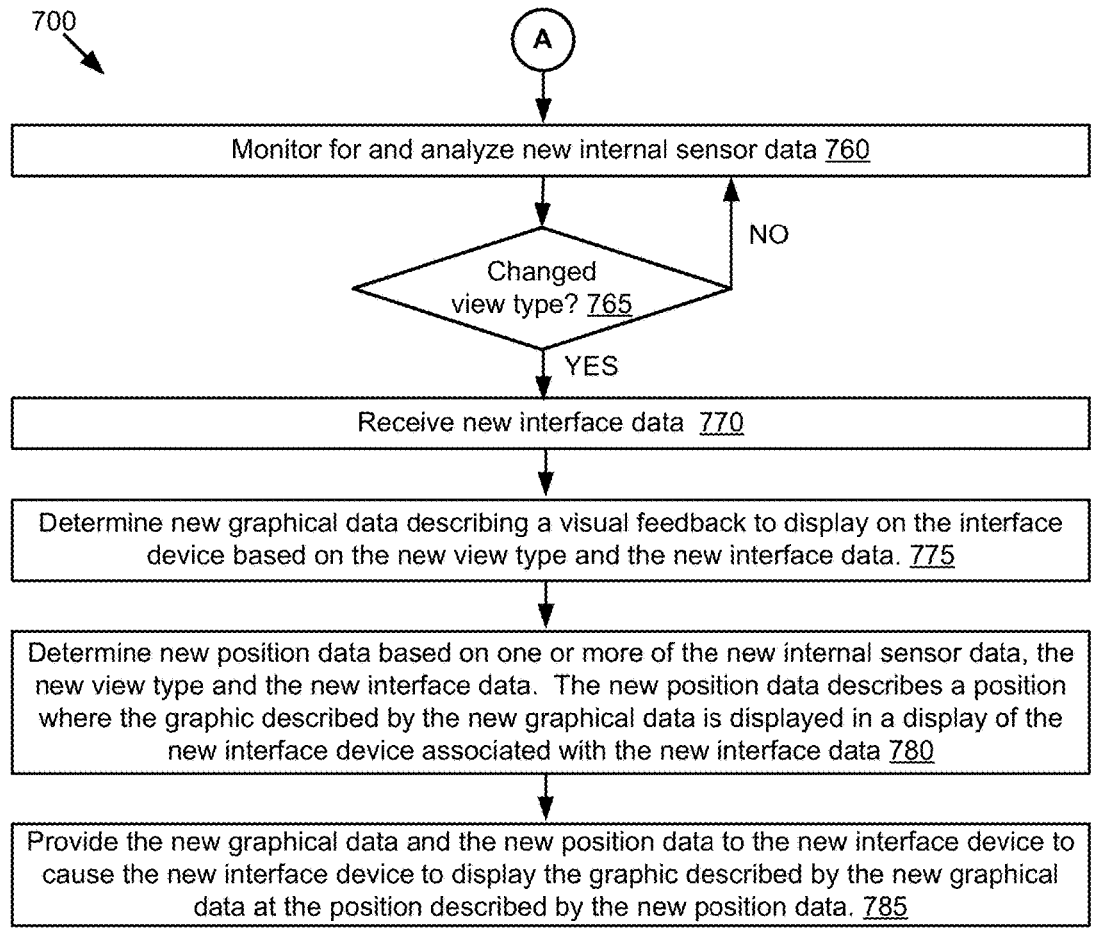

Referring now to FIGS. 7A and 7B, depicted is a flow diagram of a method 700 for providing visual feedback according to some embodiments. One or more of the steps described herein for the method 700 may be executed by one or more computer systems 200.

Referring now to FIG. 7A. At step 705, external sensor data is received. At step 710, GPS data is received. At step 715, weather data is received. The external sensor data, GPS data and weather data may be provided as inputs to one or more ADAS systems. At step 720, ADAS data is received. For example, the ADAS data is received as a response to the inputs provided to the one or more ADAS systems.

At step 725, situation data is determined based on one or more of the following inputs: the external sensor data; the GPS data; the weather data; and the ADAS data. For example, a situation awareness system determines the situation data based on one or more of these inputs to the situation awareness system as described, for example, with reference to steps 705, 710, 715 and 720.

At step 730, internal sensor data is received. For example, the internal sensor data is received as an input to the situation awareness system. At step 735, view type data describing a view type of a driver is determined. For example, the situation awareness system determines the view type data based on the internal sensor data. The view type data may describe, for example, whether the driver is in a forward-looking view type or a non-forward-looking view type.

At step 740, interface data is received. For example, the interface data is received as an input to the situation awareness system. In some embodiments, the operating system or wireless card of one or more interface devices may include hooks which provide the communication unit with the interface data. The communication unit then provides the interface data to the situation awareness system. The interface data describes a type of interface device being used by the driver. For example, the interface data identifies the interface device as one of a smartphone, laptop, smartwatch, tablet computing device, AR goggles, AR glasses, etc. If the interface device is an AR display device, then the interface data may include an image of what the driver is viewing in the real-world as they are looking through the AR display device.

At step 745, the graphical data is determined. The graphical data describes a visual feedback to display the interface device. In some embodiments, the graphical data is determined by the situation awareness system. The graphical data is determined, for example, based on the situation data, view type data and the interface data.

At step 750, position data is determined. The position data describes a position where the visual feedback described by the graphical data is displayed in an electronic display of the interface device. In some embodiments, the position data is determined by the situation awareness system. The position data is determined, for example, based on one or more of the internal sensor data, the view type and the interface data.

At step 755, the graphical data and the position data are provided to the interface device, thereby causing the interface device to display the visual feedback described by the graphical data at the position described by the position data. In some embodiments, the graphical data and the position data are provided to the interface device by the situation awareness system (or by the communication unit 145 based on an instruction provided to the communication unit 145 by the situation awareness system).

Referring now to FIG. 7B. At step 760, monitoring for the presence of new internal sensor data occurs. The new internal sensor data includes internal sensor data that is received subsequent to the internal sensor data that is received at step 730. If new internal sensor data is detected, then the new internal sensor data is analyzed. For example, the new internal sensor data is analyzed to determine whether the view type of the driver has changed. Determining whether the view type has changed may include determining whether the position of the driver has changed such that the visual feedback generated responsive to step 755 obstructs an object which is being viewed by the driver.

At step 765, a determination is made regarding whether the new internal sensor data indicates that the view type has changed. If the view type has not changed, then the method 700 proceeds to step 760. If the view type has changed, then the method 700 proceeds to step 770.

At step 770, new interface data may be received. This is an optional step of the method 700 since a change in view type does not necessarily mean a change in the interface device being used by the driver. Regardless, the new interface data may be used to confirm that the driver is still using the same interface device which was used by the driver prior to step 760.

At step 775, new graphical data is generated response to the change in view type (and, optionally, the change in the interface device being used by the driver if so indicated by the new interface data).

At step 780, new position data is determined based on one or more of the new internal sensor data, the new view type and the new interface data.

At step 785, the new graphical data and the new position data is provided to the interface device being used by the driver.

Figure 8:
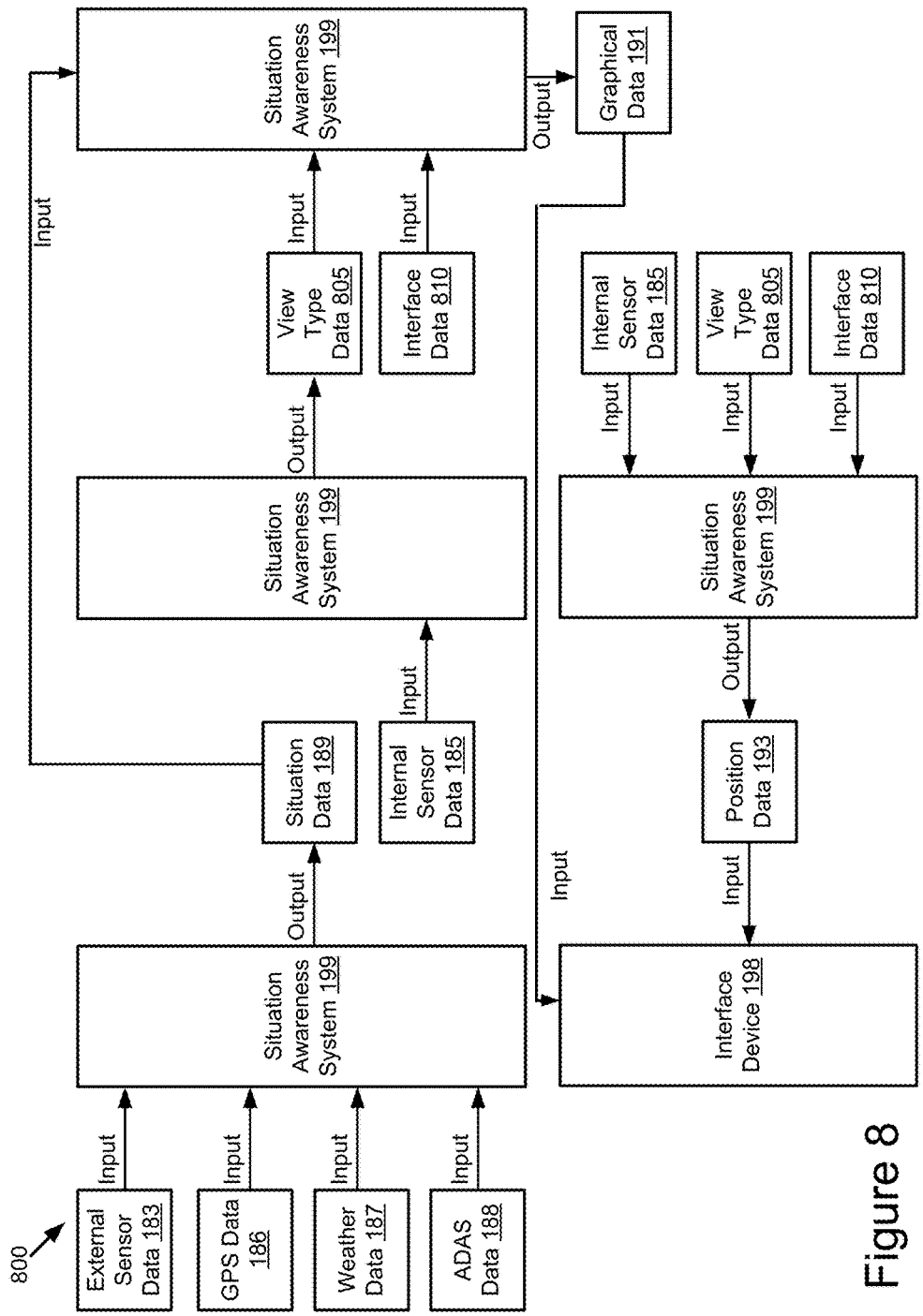
FIG. 8 is a block diagram illustrating a process for the situation awareness system to control the operation of an interface device according to some embodiments.

Referring now to FIG. 8, depicted is a block diagram illustrating a process 800 for the situation awareness system 199 to control the operation of an interface device 198 according to some embodiments.

One or more of the following are received as inputs to the situation awareness system 199: the external sensor data 183; the GPS data 186; the weather data 187; and the ADAS data 188. The situation awareness system 199 analyzes these inputs and, responsive to this analysis, outputs the situation data 189.

The situation awareness system 199 receives the internal sensor data 185 as an input. The situation awareness system 199 analyzes the internal sensor data 185 and outputs, based on this analysis, view type data 805 describing a view type for the driver as indicated by analysis of the internal sensor data 185. The view type data 805 may be stored in a non-transitory memory (e.g., the memory 127).

One or more of the following are received as inputs to the situation awareness system 199: the situation data 189 (see, e.g., the top of the situation awareness system 199); the view type data 805; and interface data 810. The interface data 810 describes the interface device being used by the driver. The interface data 810 may be stored in a non-transitory memory (e.g., the memory 127). The situation awareness system 199 analyzes these inputs and, responsive to this analysis, outputs the graphical data 191.

One or more of the following are received as inputs to the situation awareness system 199: the internal sensor data 185; the view type data 805; and the interface data 810. The situation awareness system 199 analyzes these inputs and, responsive to this analysis, outputs the position data 193.

The situation awareness system 199 provides the position data 193 and the graphical data 191 as inputs to the interface device 198 (or causes the communication unit 145 to provide these inputs to the interface device 198) to cause the interface device 198 to display the visual feedback described by the graphical data 191 at a position in the electronic display of the interface device 198 which is described by the position data 193.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A method implemented by a vehicle, the method comprising:
   analyzing external sensor data to identify a traffic situation;
   determining, based on internal sensor data, view type data describing a view type;
   generating graphical data describing visual feedback that visually depicts information describing the traffic situation;
   generating position data describing a position where the visual feedback is displayed in an electronic display of an interface device based on the view type; and
   providing, by a processor of the vehicle, the position data and the graphical data to the interface device to cause the interface device to display the visual feedback at the position described by the position data.

2. The method of claim 1, wherein the interface device is an augmented reality display device and the graphical data is operable to cause the augmented reality display device to provide an augmented reality experience.

3. The method of claim 2, wherein the augmented reality display device is selected from a group that includes: a set of augmented reality goggles; and a set of augmented reality glasses.

4. The method of claim 2, wherein the augmented reality display device is a three-dimensional heads-up display device which is an element of the vehicle.

5. The method of claim 1, wherein the interface device is selected from a group that includes: a smartphone; a laptop; a tablet computer; an electronic book reader; and a smartwatch.

6. The method of claim 1, further comprising:
   analyzing new internal sensor data;
   determining that the view type changed from a non-forward looking view type to a forward-looking view type;
   generating new graphical data;
   determining new position data based on the new internal sensor data and the forward-looking view type; and
   providing the new graphical data and the new position data to a new interface device to cause the new interface device to display a graphic described by the new graphical data at a new position described by the new position data.

7. The method of claim 1, wherein the position data is operable so that the position where the visual feedback is displayed in the electronic display of the interface device does not obstruct an object which is being viewed by a driver of the vehicle.

8. A system of a vehicle, the system comprising:
   an onboard vehicle computer system including a non-transitory memory storing computer code which, when executed by the onboard vehicle computer system causes the onboard vehicle computer system to:
   analyze external sensor data recorded by one or more external sensors to identify a traffic situation;
   determine, based on internal sensor data, view type data describing a view type;
   generate graphical data describing visual feedback that visually depicts information describing the traffic situation;
   generate position data describing a position where the visual feedback is displayed in an electronic display of an interface device based on the view type; and
   provide, by a processor of the vehicle, the position data and the graphical data to the interface device to cause the interface device to display the visual feedback at the position described by the position data.

9. The system of claim 8, wherein the interface device is an augmented reality display device and the graphical data is operable to cause the augmented reality display device to provide an augmented reality experience.

10. The system of claim 9, wherein the augmented reality display device is selected from a group that includes: a set of augmented reality goggles; and a set of augmented reality glasses.

11. The system of claim 9, wherein the augmented reality display device is a three-dimensional heads-up display device which is an element of the vehicle.

12. The system of claim 8, wherein the interface device is selected from a group that includes: a smartphone; a laptop; a tablet computer; an electronic book reader; and a smartwatch.

13. The system of claim 8, wherein the non-transitory memory stores additional computer code which, when executed by the onboard vehicle computer system causes the onboard vehicle computer system to:
analyze new internal sensor data;
determine that the view type changed from a non-forward looking view type to a forward-looking view type;
generate new graphical data;
determine new position data based on the new internal sensor data and the forward-looking view type; and
provide the new graphical data and the new position data to a new interface device to cause the new interface device to display a graphic described by the new graphical data at a new position described by the new position data.

14. The system of claim 8, wherein the position data is operable so that the position where the visual feedback is displayed in the electronic display of the interface device does not obstruct an object which is being viewed by a driver of the vehicle.

15. A computer program product comprising a non-transitory memory of an onboard vehicle computer system of a vehicle storing computer-executable code that, when executed by the onboard vehicle computer system, causes the onboard vehicle computer system to:
analyze external sensor data identify a traffic situation;
determine, based on internal sensor data, view type data describing a view type;
generate graphical data describing visual feedback that visually depicts information describing the traffic situation;
generate position data describing a position where the visual feedback is displayed in an electronic display of an interface device based on the view type; and
provide, by a processor of the vehicle, the position data and the graphical data to the interface device to cause the interface device to display the visual feedback at the position described by the position data.

16. The computer program product of claim 15, wherein the interface device is an augmented reality display device and the graphical data is operable to cause the augmented reality display device to provide an augmented reality experience.

17. The computer program product of claim 16, wherein the augmented reality display device is selected from a group that includes: a set of augmented reality goggles; and a set of augmented reality glasses.

18. The computer program product of claim 16, wherein the augmented reality display device is a three-dimensional heads-up display device which is an element of the vehicle.

19. The computer program product of claim 15, wherein the interface device is selected from a group that includes: a smartphone; a laptop; a tablet computer; an electronic book reader; and a smartwatch.

20. The computer program product of claim 15, wherein the non-transitory memory stores additional computer code which, when executed by the onboard vehicle computer system causes the onboard vehicle computer system to:
analyze new internal sensor data;
determine that the view type changed from a non-forward looking view type to a forward-looking view type;
generate new graphical data;
determine new position data based on the new internal sensor data and the forward-looking view type; and
provide the new graphical data and the new position data to a new interface device to cause the new interface device to display a graphic described by the new graphical data at a new position described by the new position data.

* * * * *